US012761664B1

(12) United States Patent
Zheng et al.

(10) Patent No.: US 12,761,664 B1
(45) Date of Patent: Oct. 13, 2026

(54) SCHEDULING METHOD AND MOVABLE APPARATUS

(71) Applicant: VisionNav Robotics USA Inc., Acworth, GA (US)

(72) Inventors: Fan Zheng, Acworth, GA (US); Yujie Lu, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/174,460

(22) Filed: Apr. 9, 2025

(51) Int. Cl.

| | |
|---|---|
| ***G05D 1/617*** | (2024.01) |
| ***G05D 1/246*** | (2024.01) |
| ***G05D 1/693*** | (2024.01) |
| ***G05D 101/15*** | (2024.01) |
| ***G05D 107/70*** | (2024.01) |
| ***G05D 109/10*** | (2024.01) |

(52) U.S. Cl.
CPC ............. *G05D 1/617* (2024.01); *G05D 1/246* (2024.01); *G05D 1/693* (2024.01); *G05D 2101/15* (2024.01); *G05D 2107/70* (2024.01); *G05D 2109/10* (2024.01)

(58) Field of Classification Search
CPC ........ G05D 1/617; G05D 1/246; G05D 1/693; G05D 2101/15; G05D 2107/70; G05D 2109/10
See application file for complete search history.

(56) References Cited

U.S. PATENT DOCUMENTS

| | | | | |
|---|---|---|---|---|
| 6,064,926 | A * | 5/2000 | Sarangapani | G05D 1/0289 701/414 |
| 9,513,627 | B1 * | 12/2016 | Elazary | G05B 19/41865 |
| 2018/0276606 | A1 * | 9/2018 | Stadie | B65G 1/137 |
| 2018/0299882 | A1 * | 10/2018 | Kichkaylo | G05B 19/41895 |
| 2019/0072966 | A1 * | 3/2019 | Zhang | G05D 1/0212 |
| 2019/0176328 | A1 * | 6/2019 | Kichkaylo | G05D 1/0231 |

(Continued)

FOREIGN PATENT DOCUMENTS

| | | |
|---|---|---|
| CN | 111222728 A | 6/2020 |
| CN | 112987721 A | 6/2021 |

(Continued)

OTHER PUBLICATIONS

English Machine Translation of CN116700298A, Accessed May 28, 2025.*

(Continued)

*Primary Examiner* — Blake A Wood
(74) *Attorney, Agent, or Firm* — MUNCY, GEISSLER, OLDS & LOWE, P.C.

(57) ABSTRACT

Embodiments of the present application relate to a scheduling method and a movable apparatus. The scheduling method includes receiving a first path from a first movable apparatus, the first path being calculated by the first movable apparatus in response to detecting a factor that affects normal driving of the first movable apparatus to avoid the first movable apparatus from being affected by the factor, to continue to execute a task; calculating whether the first path conflicts with a second path of each of second movable apparatuses in a working area; determining, based on at least a calculated result, first information for controlling the first movable apparatus to drive; and sending the first information to the first movable apparatus.

18 Claims, 10 Drawing Sheets

(56) References Cited

U.S. PATENT DOCUMENTS

| | | | | | |
|---|---|---|---|---|---|
| 2020/0033867 | A1* | 1/2020 | Grant | .................... | G05D 1/0221 |
| 2021/0200219 | A1* | 7/2021 | Gaschler | .............. | G05D 1/0274 |
| 2022/0041181 | A1* | 2/2022 | Liu | .................... | B60W 60/0011 |
| 2023/0322491 | A1* | 10/2023 | Peng | .................... | B65G 1/1375<br>700/216 |
| 2024/0142985 | A1* | 5/2024 | Wise | .................... | G05D 1/0274 |
| 2024/0345602 | A1* | 10/2024 | Kim | ....................... | G05D 1/644 |

FOREIGN PATENT DOCUMENTS

| | | | | | |
|---|---|---|---|---|---|
| CN | 115185286 | A | * | 10/2022 | ........... G05D 1/0214 |
| CN | 116700298 | A | * | 9/2023 | |

OTHER PUBLICATIONS

English Machine Translation of CN115185286A, Accessed May 14, 2026 (Year: 2022).*

* cited by examiner

A: <A, X1, Y1>
B: <B, X2, Y2>
C: <C, X3, Y3>
D: <D, X4, Y4>
E: <E, X5, Y5>
F: <F, X6, Y6>
G: <G, X7, Y7>
H: <H, X8, Y8>
I: <I, X9, Y9>
FIG. 2B
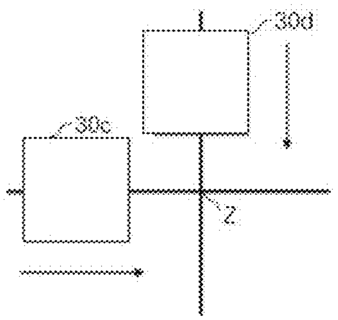
FIG. 3A
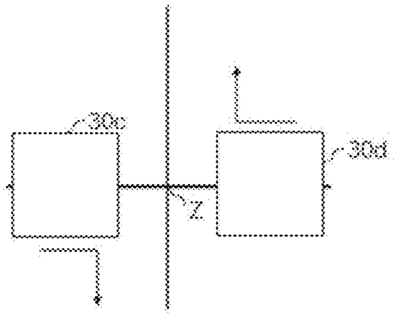
FIG. 3B
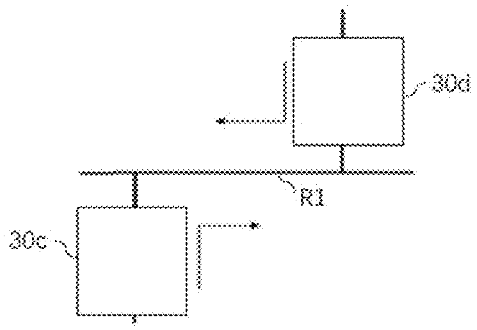
FIG. 3C
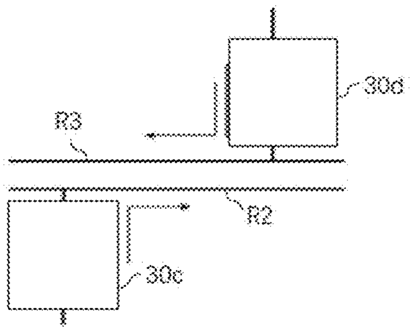
FIG. 3D

SCHEDULING METHOD AND MOVABLE APPARATUS

TECHNICAL FIELD

The present disclosure relates to the field of artificial intelligence, and in particular, to a scheduling method and a movable apparatus.

BACKGROUND

In the field of industrial logistics, when a plurality of movable apparatuses are in operation, a scheduling system conducts path planning and real-time traffic control. When the operating environment of the movable apparatuses undergoes dynamic changes, it is desirable to make timely path adjustments.

BRIEF DESCRIPTION OF THE DRAWINGS

The accompanying drawings are intended to provide a further understanding of the present disclosure and form a part of this disclosure, and together with the following detailed description, serve to explain the present disclosure and do not constitute a limitation on the present disclosure. In the accompanying drawings:

FIG. 2B is a schematic diagram of information about nodes in the path map according to the embodiment shown in FIG. 2A;

FIG. 3A, FIG. 3B, FIG. 3C, FIG. 3D, FIG. 3E, FIG. 3F, FIG. 3G and FIG. 3H are schematic diagrams of scenarios in which a conflict occurs between movable apparatuses according to one or more embodiments of the present disclosure;

DETAILED DESCRIPTION OF THE DISCLOSURE

Figure 1:
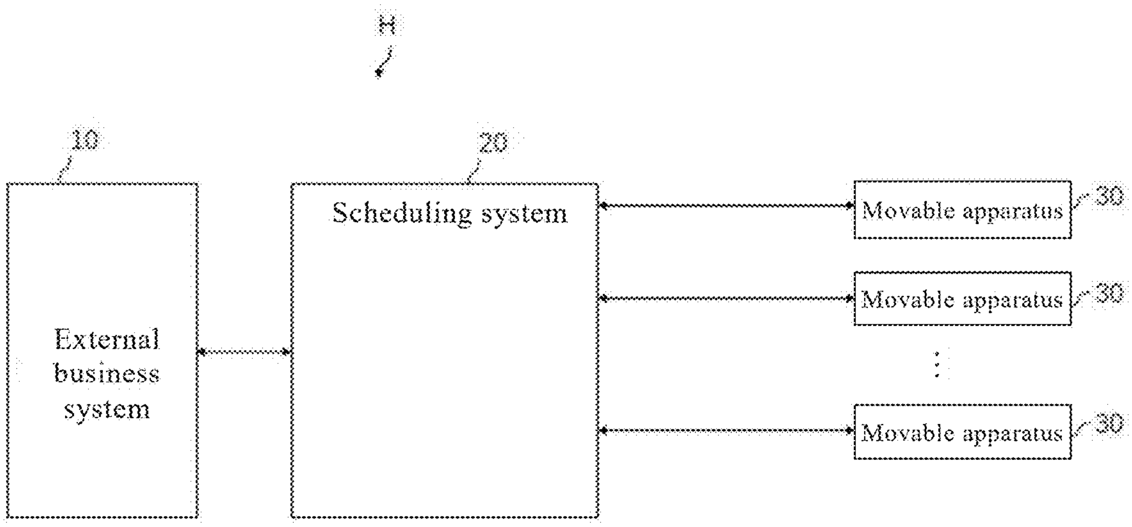
FIG. 1 is a schematic diagram of an overall system according to one embodiment of the present disclosure.

The following description in conjunction with the accompanying drawings is provided to help understand the present disclosure. The following discussion focuses on specific implementations and embodiments of the present disclosure. The emphasis is provided to help describe teachings, and should not be construed as a limitation to the scope or applicability of the teachings. However, other embodiments is utilized based on the teachings disclosed in this patent application.

In the present disclosure, the terms "comprise," "include", "have" and any other variants are intended to cover non-exclusive inclusion, for example, a process, method, system, apparatus, product, or device that includes a list of actions or units is not necessarily limited to those expressly listed actions or units, but includes other actions or units not expressly listed or inherent to such the process, method, system, apparatus, product, or device.

In addition, unless otherwise explicitly stated, "or" refers to an inclusive "or" rather than an exclusive "or." For example, any one of the following satisfies a condition A or B: A is true (or existing) and B is false (or not existing), A is false (or not existing) and B is true (or existing), and both A and B are true (or existing).

The following disclosure provides various implementations or examples, which are used to implement different features of the present disclosure. Specific examples of components and configurations described below are used to simplify the present disclosure. As can be expected that these descriptions are merely for illustration, and are not intended to limit the present disclosure. For example, in the following description, "first", "second", and the like are intended to distinguish between different objects but do not describe a particular order of the objects. For example, without departing from the scope of the present disclosure, a first parameter is referred to as a second parameter, and similarly, the second parameter is referred to as the first parameter. In addition, in the present disclosure, component symbols and/or numbers is repeatedly used in a plurality of embodiments. The repeated use is for the purpose of brevity and clarity, and does not represent a relationship between different discussed embodiments and/or configurations.

In addition, for ease of description, spatially relative terms such as "below", "under", "lower part", "above", "upper part", "lower part", "left", and "right" is used in this disclosure to describe a relationship between one component or feature and another component or feature as illustrated in the figures. In addition to the orientation depicted in the figure, the spatially relative terms are intended to cover different orientations of an apparatus during use or operation. A device is oriented in another manner (rotated by 90 degrees or at another orientation), and the spatially relative descriptors used in this disclosure are also correspondingly explained. It should be understood that when a component is referred to as being "connected to" or "coupled to" another component, the component is directly connected to or coupled to the another component, or an intermediate component exist.

Although numerical ranges and parameters used to define a broad scope of the present disclosure are approximate values, relevant values in specific embodiments are presented as precisely as possible herein. However, any value essentially inevitably contains a standard deviation caused by an individual test method. Herein, "about" typically means that an actual value is within plus or minus 10%, 5%, 1%, or 0.5% of a particular value or range. Alternatively, the term "about" represents that an actual value falls within an acceptable standard error of the average value, and is determined according to consideration of a person of ordinary skill in the art to which the present disclosure belongs. It is understood that, except experimental examples, or unless otherwise explicitly stated, all ranges, amounts, values, and percentages used herein (for example, an amount of a material, a time length, a temperature, an operating condition, a number ratio, and the like) are modified by "about". Therefore, unless otherwise specified to the contrary, numerical parameters disclosed in this disclosure and appended claims are approximate values, and is changed according to requirements. These numerical parameters should be understood as at least a specified number of valid digits and a numerical value obtained by using a common carry method. Herein, the numerical range is represented as from one endpoint to the other endpoint or between two endpoints. Unless otherwise specified, the numerical range described herein includes endpoints.

In the field of industrial logistics, when a plurality of movable apparatuses are in operation, a scheduling system conducts path planning and real-time traffic control. When the operating environment of the movable apparatuses undergoes dynamic changes, it is desirable to make timely path adjustments.

The inventor recognized that if the scheduling system performs path planning for each movable apparatus based on a fixed path map, the movable apparatuses drive only in particular paths. The path map is a pre-drawn map used for representing nodes within a working area of the movable apparatuses as well as drivable paths (or referred to as path segments) between nodes, as described in detail in FIG. 2A below. Once the operating environment of the movable apparatus undergoes the dynamic changes, it is difficult for the scheduling system to make timely path adjustments, and therefore the movable apparatuses typically have to stop and wait. Even if the vehicle applies to the scheduling system for re-planned paths and the scheduling system calculates new paths, due to the limited paths in the fixed path map, the new path often causes the movable apparatus to take a long detour. The above problems lead to low flexibility, low operation efficiency, and poor responsiveness to dynamic changes of the movable apparatuses.

The inventor further recognized that if the movable apparatus calculates a local path to bypass, for example, but not limited to, an obstacle, based on the dynamic changes that occur in the operating environment, the response ability for the dynamic changes is improved. However, due to limited sensing range of sensors of the movable apparatuses and the lack of location and planning information of other movable apparatuses in the operating environment, the movable apparatuses lack understanding of the global information of the operating environment and multi-vehicle system level. Therefore, path planning based on the movable apparatus cannot implement efficiency optimization at the multi-vehicle system level, and even traffic congestion is often caused. As a result, calculating the paths by the movable apparatus has the problems of lacking the global scheduling and being unable to balance the operating efficiency of multiple vehicles.

In view of this, the present disclosure proposes a scheduling method and a movable apparatus to solve the above-mentioned problem.

FIG. 1 is a schematic diagram of an overall system H according to one embodiment of the present disclosure. As shown in FIG. 1, the overall system H includes: an external business system 10, a scheduling system 20, and one or more movable apparatuses 30.

The external business system 10 is an external business source or data provider that interacts with the scheduling system 20, and it provides relevant business data or instructions. In some embodiments, the external business system 10 is configured to send instruction information about tasks to the scheduling system 20, and is configured to receive task execution information fed back from the scheduling system 20. In some embodiments, the external business system 10 is, for example, but not limited to, a Warehouse Management System ("WMS" for short).

The scheduling system 20 is configured to receive data or instructions from the external business system 10, and manage and coordinate operation of one or more movable apparatuses 30. In some embodiments, the scheduling system 20 is responsible for task allocation, path planning, traffic control, and the like. In some embodiments, the scheduling system 20 is configured to include a hardware part and a software part. The hardware part includes, for example, but not limited to, a controller. In some embodiments, the hardware part of the scheduling system 20 includes, for example, but not limited to, a controller, a communication module, and sensors. In some embodiments, the software part of the scheduling system 20 includes, for example, but not limited to, a path planning algorithm module, a task allocation algorithm module, and a monitoring and management module. In some embodiments, the controller of the scheduling system 20 typically includes a processor, a memory, an input/output interface, a mainboard, a peripheral circuit, an element, and the like at a hardware level. In some embodiments, the controller of the scheduling system 20 typically includes a control algorithm, an operating system, a communication protocol, and the like at a software level. A controller in this disclosure refers to a set of controllers configured to execute the same or different tasks. The scheduling system 20 schedules, for example, but not limited to, a movable apparatus such as mobile robots, autonomous mobile devices, unmanned aerial vehicles, handling equipments, and automated guided forklifts. The mobile robots include, for example, but not limited to, Automated Guided Vehicles (AGVs), Autonomous Mobile RobotS (AMRs), humanoid robots, floor scrubbing robots, sweeping robots, agricultural robots, patrol robots and the like. The autonomous mobile devices include, for example, but not limited to, intelligent vehicles and intelligent electric vehicles. In some embodiments, the scheduling system 20 schedule any intelligent movable apparatus.

In some embodiments, the scheduling system 20 is configured to receive instruction information about the tasks from the external business system 10. In some embodiments, the scheduling system 20 is configured to determine, based on the instruction information about the task, a movable apparatus 30 for executing the task, plan a global path and a control timing sequence of the global path for the movable apparatus 30 for executing the task, and send the planned global path and the control timing sequence of the global path to the corresponding movable apparatus 30. The global path is a complete driving route that is from a starting point of the task to an end point of the task and that is planned for the movable apparatus 30 to complete the task of the movable apparatus 30. The global path includes one path or a plurality of paths. The control timing sequence is a time interval during which the movable apparatus 30 occupies each path. The control timing sequence is also referred to as a time window.

In some embodiments, the scheduling system 20 is configured to maintain communicate with each of the plurality of movable apparatuses to perform real-time traffic control and status monitoring. In some embodiments, the scheduling system 20 is configured to calculate, based on at least information reported by the plurality of movable apparatuses, control paths used for the plurality of movable apparatuses to drive. In some embodiments, the control path is a path that extends forward from a current location by a specific distance and does not conflict with other movable apparatuses. The specific distance is determined based on at least a current location, a braking ability, and a maximum driving speed of the movable apparatus. On the one hand, it needs to be ensured that the movable apparatus accelerates to the maximum speed with sufficient efficiency, and on the other hand, it needs to be ensured that the movable apparatus can stop stably before reaching an end of the control path under normal circumstances. Therefore, the specific distance is a distance to ensure that the movable apparatus accelerates to the maximum speed, and brakes after the maximum speed and stops stably before the end. In some embodiments, the control path starts from the global path. In some embodiments, the control path starts from a local path calculated by the scheduling system 20 or the movable apparatus 30. The local path is a path that is calculated in response to detecting a factor that affects normal driving of the movable apparatus 30, so that the movable apparatus 30 is avoided from being affected by the factor to continue to execute the task for which the movable apparatus 30 is responsible. In some embodiments, the scheduling system 20 calculates the global path by using, for example, but not limited to, Rapid Random Tree (RRT) algorithm and a variant thereof, real-time obstacle avoidance algorithm based on sensor information, Dynamic Window Approach, Artificial Potential Field method, Spatio-Temporal Search algorithm, Spatio-Temporal A* algorithm, improved A* algorithm, Dijkstra algorithm, Genetic algorithm, Ant Colony Optimization algorithm, Particle Swarm Optimization algorithm, Visibility Graph method, Tangent Graph method, Breadth-First Search (BFS) algorithm, or Depth-First Search (DFS) algorithm. In some embodiments, the scheduling system 20 calculates the global path and the control timing sequence of the global path by using, for example, but not limited to, the Spatio-Temporal A* algorithm, the improved A* algorithm, and the Dijkstra algorithm. In some embodiments, the scheduling system 20 calculates the control timing sequence of the global path by using, for example, but not limited to, an earliest start time-latest end time algorithm, a priority-based time window allocation algorithm, and the genetic algorithm. In some embodiments, the scheduling system 20 is configured to feedback execution information about the task to the external business system 10.

In some embodiments, the scheduling system 20 is configured to receive a first path from the movable apparatus 30. In some embodiments, the first path from the movable apparatus 30 is the local path calculated by the movable apparatus 30. In some embodiments, the local path is calculated by the movable apparatus 30 in response to detecting the factor that affects normal driving of the movable apparatus 30, so that the movable apparatus 30 is avoided from being affected by the factor to continue to execute the task for which the movable apparatus 30 is responsible. The factor that affects normal driving of the movable apparatus 30 include, for example, but not limited to, an obstacle, derailment of the movable apparatus from a track, electromagnetic interference, a terrain change, and water or snow accumulation caused by severe weather and the like.

In some embodiments, the scheduling system 20 is configured to calculate whether the first path conflicts with a second path of each of other movable apparatuses in the working area. In some embodiments, the scheduling system 20 is configured to determine, based on at least a calculated result, first information for controlling the movable apparatus 30 to drive, and send the determined first information to the movable apparatus 30.

The movable apparatus 30 executes the task under management of the scheduling system 20. The task includes, for example, but not limited to, material handling, goods delivery, and automated vehicle driving. In some embodiments, the movable apparatus 30 executes the task by itself. In some embodiments, the movable apparatus 30 is configured to include a hardware part and a software part. The hardware part includes, for example, but not limited to, a controller. In some embodiments, the hardware part of the movable apparatus 30 includes, for example, but not limited to, a controller, a communication module, and sensors. The software part of the movable apparatus 30 includes, for example, but not limited to, a path planning algorithm module as well as a monitoring and management module. In some embodiments, the controller of the movable apparatus 30 typically includes a processor, a memory, an input/output interface, a mainboard, a peripheral circuit, an element, and the like at a hardware level. In some embodiments, the controller of the movable apparatus 30 typically includes a control algorithm, an operating system, a communication protocol, and the like at a software level. The controller in this disclosure refer to a set of controllers configured to execute the same or different tasks.

The movable apparatus 30 is, for example, but not limited to, a movable apparatus such as a mobile robot, an autonomous mobile device, an unmanned aerial vehicle, material handling equipment, and an automated guided forklift. The mobile robot includes, for example, but not limited to, the AGVs, the AMRs, the humanoid robots, the moppings robot, the sweeping robots, the agricultural robots, the patrol robots and the like. The autonomous mobile device includes, for example, but not limited to, the intelligent vehicles and the intelligent electric vehicles. In some embodiments, the movable apparatus 30 is any intelligent movable apparatus. The number of movable apparatuses 30 that execute the tasks within the same working area is one or more. The movable apparatus 30 is configured to communicate with the scheduling system 20. In some embodiments, the movable apparatus 30 is configured to be provided with sensors to detect the working area. In some embodiments, the sensors of the movable apparatus 30 are configured to detect abnormal cases that affect normal working of the movable apparatus and that appears in the working area, such as an obstacle, derailment of the movable apparatus from a track, electromagnetic interference, a terrain change, and water or snow accumulation caused by severe weather. In some embodiments, the sensors are, for example, but not limited to, laser radars, visual sensors, inertial navigation sensors, ultrasonic sensors, infrared sensors, laser obstacle avoidance sensors, photoelectric sensors and the like.

In some embodiments, the movable apparatus 30 calculates the first path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent Graph method, the Breadth-First Search (BFS) algorithm, or the Depth-First Search (DFS) algorithm. In some embodiments, the first path is a local path. In some embodiments, the first path is obtained through calculation by the movable apparatus 30 in response to detecting the factor that affects normal driving of the movable apparatus 30, so that the movable apparatus 30 is avoided from being affected by the factor to continue to execute the task for which the movable apparatus 30 is responsible.

In some embodiments, the movable apparatus 30 is configured to send the first path to the scheduling system 20. In some embodiments, the movable apparatus 30 is configured to determine whether a message allowing to use the first path is received. If the message allowing to use the first path is received, the movable apparatus 30 is configured to drive along the first path. If the message allowing to use the first path is not received, the movable apparatus 30 is configured to stop driving, and is configured to receive the first information for controlling the movable apparatus to drive.

Figure 2A:
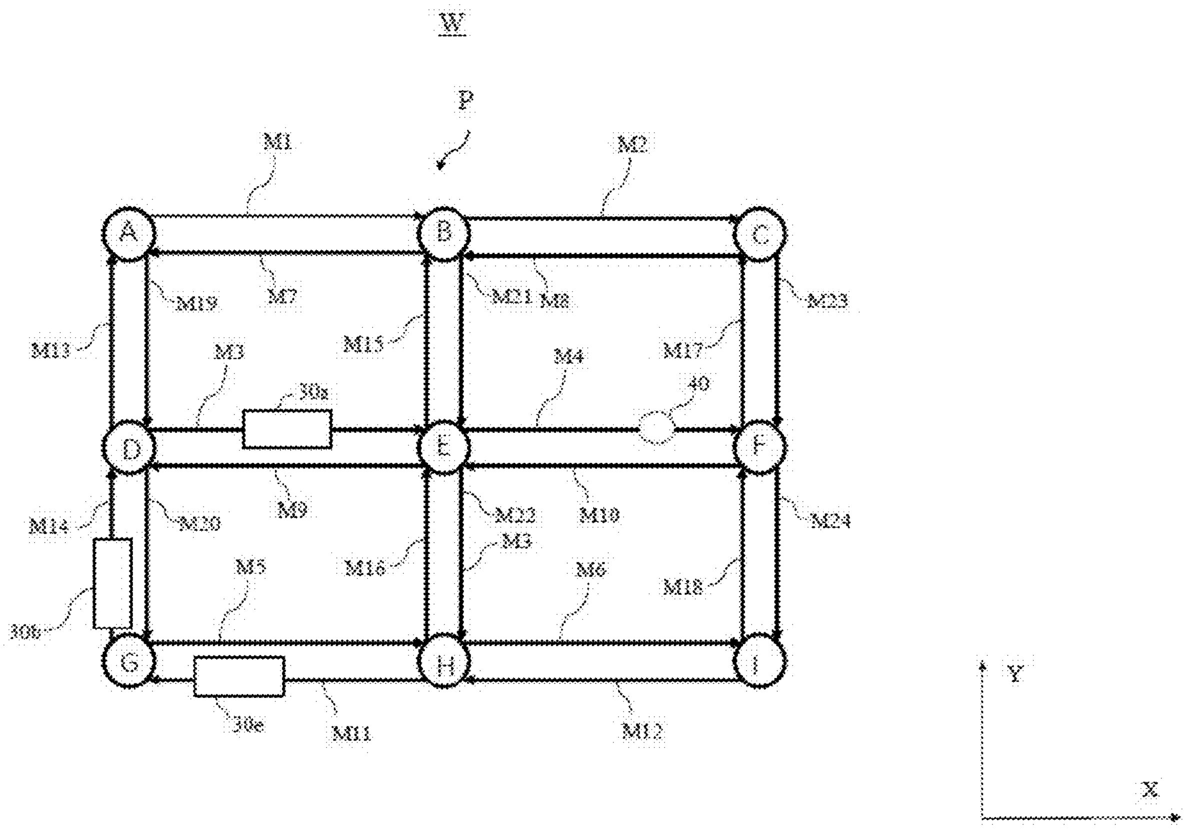
FIG. 2A is a schematic diagram of a path map representing a working area according to one embodiment of the present disclosure.

FIG. 2A is a schematic diagram of a path map P representing a working area W according to one or more embodiments of the present disclosure. FIG. 2B is a schematic diagram of information about nodes A, B, C, D, E, F, G, H, and I in the path map P representing the working area W according to the embodiment shown in FIG. 2A. The path map P is a pre-drawn map used for representing nodes in the working area W of the movable apparatuses and paths between nodes, and is an abstract digital expression of the working area W of the movable apparatuses. The path map P is a two-dimensional planar image. In some embodiments, the path map P is a three-dimensional model. As shown in FIG. 2A and FIG. 2B, the path map P includes nodes A to I, and paths M1, M2, M3, M4, M5, M6, M7, M8, M9, M10, M11, M12, M13, M14, M15, M16, M17, M18, M19, M20, M21, M22, M23, and M24. The node A and the node G are an entrance and an exit of the working area W, respectively. The nodes B, C, D, E, F, H, and I are goods handling points in the working area W. In some embodiments, any one of the nodes A to I is a charge point of the movable apparatus, a goods storage location, or a material loading and unloading station of a production line. A number, distribution manners, and locations of the nodes in the working area W is set based on a configuration and need of a work site. In some embodiments, information about each of the nodes A to I is represented by using a node number, an X coordinate, and a Y coordinate. The X coordinate and the Y coordinate respectively represent a location of the node on the X direction and a location of the node on the Y direction in the working area W. For example, information about the node A is represented as (A, X1, Y1), information about the node B is represented as (B, X2, Y2), information about the node C is represented as (C, X3, Y3), information about the node D is represented as (D, X4, Y4), information about the node E is represented as (E, X5, Y5), information about the node F is represented as (F, X6, Y6), information about the node G is represented as (G, X7, Y7), information about the node H is represented as (H, X8, Y8), and information about the node I is represented as (I, X9, Y9). In some embodiments, any two of the nodes are set to include two paths in opposite directions. In some embodiments, any two of the nodes are set to include any number of paths in any direction based on the configuration and need of the work site. The paths M1 to M24 form an interconnected channel network, which is distributed among the nodes A to I and is provided for the movable apparatuses to drive on, thereby providing the driving paths for material transportation, device movement, or the like. Any one of the paths M1 to M24 is an area such as a workshop passage or a warehouse aisle. The paths M1 to M24 is connected to each other. There is a conflict relationship among the paths M1 to M24. The existence of a conflict relationship between the paths is understood as follows: if two movable apparatuses experience contour interference when driving on their respective paths, then there is a conflict relationship between these two paths.

FIG. 2A further shows two movable apparatuses: a first movable apparatus 30*a* and a second movable apparatus 30*b*. The first movable apparatus 30*a* and the second movable apparatus 30*b* are similar to the movable apparatus 30 described above. The paths M1 to M24 are provided for the first movable apparatus 30*a* and the second movable apparatus 30*b* to drive on. FIG. 2A further shows an obstacle 40 that affects normal working of the first movable apparatus 30*a*.

FIG. 3A, FIG. 3B, FIG. 3C, FIG. 3D, FIG. 3E, FIG. 3F, FIG. 3G, and FIG. 3H are schematic diagrams of scenarios in which a conflict occurs between movable apparatuses according to one or more embodiments of the present disclosure. FIG. 3A to FIG. 3H show a movable apparatus 30*c* and a movable apparatus 30*d*. The movable apparatus 30*c* and the movable apparatus 30*d* are similar to the movable apparatus 30 described above.

As shown in FIG. 3A, the movable apparatus 30*c* drives to the right side along the horizontal direction, and is arranged to arrive at a path cross point Z at a time TO. The movable apparatus 30*d* drives to the downward side along the vertical direction, and is arranged to arrive at the path cross point Z at the time TO. Both the movable apparatus 30*a* and the movable apparatus 30*d* arrive at the path cross point Z at TO, and the two conflict with each other in time and space.

As shown in FIG. 3B, the movable apparatus 30*c* drives to the right side along the horizontal direction and then intends to drive to the downward side along the vertical direction, and is arranged to arrive at the path cross point Z at the time TO. The movable apparatus 30*d* drives to the left side along the horizontal direction and then intends to drive to the upper side along the vertical direction, and is arranged to arrive at the path cross point Z at the time TO. Both the movable apparatus 30*c* and the movable apparatus 30*d* arrive at the path cross point Z at the time TO, and the two conflict with each other in time and space.

As shown in FIG. 3C, the movable apparatus 30*c* drives to the upward side along the vertical direction and is arranged to drive to the right side on a path R1 along the horizontal direction at the time TO. The movable apparatus 30*d* drives to the downward side along the vertical direction and is arranged to drive to the left side on the path R1 along the horizontal direction at the time TO. The two drive towards each other on the path R1, and conflict with each other in time and space.

As shown in FIG. 3D, the movable apparatus 30*c* drives to the upward side along the vertical direction and is arranged to drive to the right side on a path R2 along the horizontal direction at the time TO. The movable apparatus 30*d* drives to the downward side along the vertical direction and is arranged to drive to the left side on a path R3 along the horizontal direction at the time TO. If the movable apparatus 30*c* driving on the path R2 and the movable apparatus 30*d* driving on the path R3 have the contour interference, the movable apparatus 30*c* conflicts with the movable apparatus 30*d*, and the two conflict with each other at least in space.

Figure 3E:
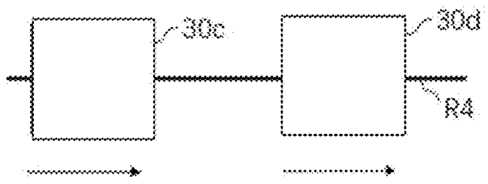

As shown in FIG. 3E, both the movable apparatus 30*c* and the movable apparatus 30*d* drive to the right side on a path R4 along the horizontal direction. If the operation speed of the movable apparatus 30*c* and the operation speed of the movable apparatus 30*d* are the same, the two do not conflict with each other. If the movable apparatus 30*d* decelerates or stops due to an emergency factor such as, but not limited to, detecting the obstacle, the operation speed of the movable apparatus 30*a* is greater than that of the movable apparatus 30*d*, and there is a possibility that a chasing conflict occurs between the movable apparatus 30*c* and the movable apparatus 30*d*.

Figure 3F:
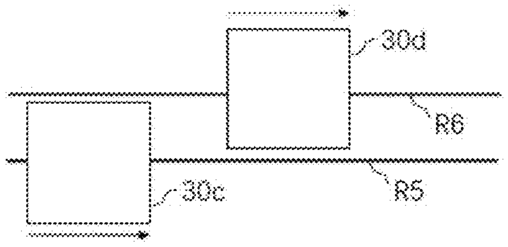

As shown in FIG. 3F, the movable apparatus 30*c* and the movable apparatus 30*d* respectively drive to the right side on a path R5 and a path R6 along the horizontal direction. If the operation speed of the movable apparatus 30*c* and the operation speed of the movable apparatus 30*d* are the same, the two do not conflict with each other. If the movable apparatus 30*d* decelerates or stops due to the emergency factor such as, but not limited to, detecting the obstacle, the operation speed of the movable apparatus 30*c* is greater than that of the movable apparatus 30*d*, and the movable apparatus 30*c* driving on the path R5 and the movable apparatus 30*d* driving on the path R6 have the contour interference. As a result, a chasing conflict occurs between the movable apparatus 30*c* and the movable apparatus 30*d*.

Figure 3G:
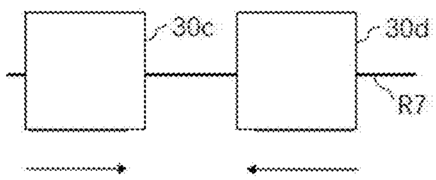

As shown in FIG. 3G, the movable apparatus 30*c* drives to the right side on a path R7 along the horizontal direction. The movable apparatus 30*d* drives to the left side on the path R7 along the horizontal direction. The movable apparatus 30*c* and the movable apparatus 30*d* drive towards each other, and the two conflict with each other.

Figure 3H:
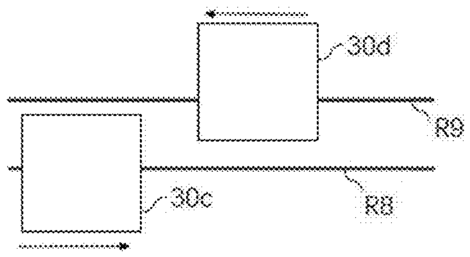

As shown in FIG. 3H, the movable apparatus 30*c* drives to the right side on a path R8 along the horizontal direction. The movable apparatus 30*d* drives to the left side on a path R9 along the horizontal direction. If the movable apparatus 30*c* driving on the path R8 and the movable apparatus 30*d* driving on the path R9 have the contour interference, the two conflict with each other.

FIG. 3A to FIG. 3H show several scenarios in which the conflict occurs between the movable apparatus 30*c* and the movable apparatus 30*d*. Certainly, a case in which the conflict occurs is not limited thereto. In some embodiments, if two movable apparatuses have the contour interference, or time interference exists even if the contour interference does not exist, it is determined that the paths corresponding to the two movable apparatuses conflict with each other. In other words, the conflict of the paths in time and space refers to a case in which the paths of a plurality of movable apparatuses interfere with or overlap each other in a time dimension or a space dimension in a process of executing the task. Consequently, the task cannot be successfully completed or collision is caused.

Figure 4:
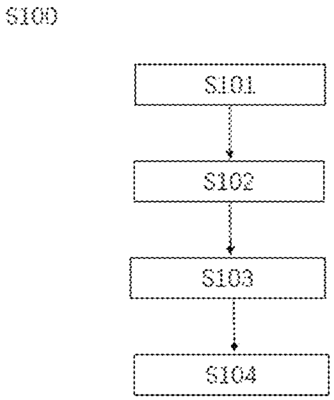
FIG. 4 is a flowchart of a scheduling method according to one embodiment of the present disclosure.
Figure 5:
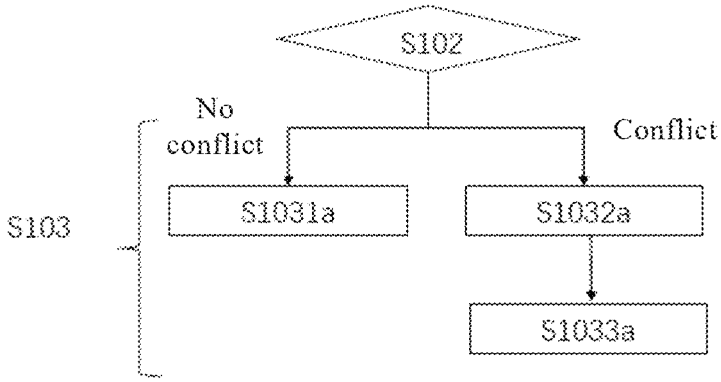
FIG. 5 is a detailed flowchart of actions S102 and S103 in the scheduling method according to the embodiment shown in FIG. 4.

FIG. 4 is a flowchart of a scheduling method S100 according to one embodiment of the present disclosure. FIG. 5 is a detailed flowchart of actions S102 and S103 in the scheduling method S100 according to the embodiment shown in FIG. 4. The present disclosure does not limit the actions to be performed completely according to action sequences shown in FIG. 4 and FIG. 5, provided that an approximately same result can be obtained. The scheduling method S100 is used to schedule any intelligent movable apparatus including, for example, but not limited to, the mobile robots, the autonomous mobile devices, the unmanned aerial vehicles, the material handling equipments, and the automated guided forklifts. The mobile robot include, for example, but not limited to, the AGVs, the AMRs, the humanoid robots, the mopping robots, the sweeping robots, the agricultural robots, the patrol robots and the like. The autonomous mobile device includes, for example, but not limited to, the intelligent vehicles and the intelligent electric vehicles.

As shown in FIG. 4, the scheduling method S100 starts with action S101.

In action S101: receive a first path from a first movable apparatus.

In some embodiments, the scheduling system is configured to receive the first path from the first movable apparatus. The scheduling system uses the scheduling system 20 described in FIG. 1. In some embodiments, a robot control system (Robot Control System, RCS for short) is configured to receive the first path from the first movable apparatus, and send the first path to the scheduling system. The scheduling system is configured to receive the first path from the RCS. The first movable apparatus uses the movable apparatus 30 described in FIG. 1, and the movable apparatus 30 is, for example, but not limited to, any intelligent movable apparatus such as the mobile robot, the autonomous mobile device, the unmanned aerial vehicle, the material handling equipment, the automated guided forklift and the like. To simplify description, the first movable apparatus, the second movable apparatus, and other movable apparatuses mentioned in this disclosure is the same as the movable apparatus 30 described above.

The first path is obtained through calculation by the first movable apparatus in response to detecting the factor that affects normal driving of the first movable apparatus, so that the first movable apparatus is avoided from being affected by the factor to continue to execute the task. In some embodiments, the first movable apparatus calculates the first path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent Graph method, the Breadth-First Search (BFS) algorithm, or the Depth-First Search (DFS) algorithm. When the sensor of the first movable apparatus detects that the factor that affects normal driving of the first movable apparatus appears in the working area, the first movable apparatus is configured to calculate the first path. The calculated first path includes a single path or a plurality of continuous paths. In some embodiments, the first path including the single path or the plurality of continuous paths is a path provided for the first movable apparatus to drive bypassing the obstacle. In some embodiments, the first path including the single path or the plurality of continuous paths is a new path that the first movable apparatus enters after leaving the derailed track. In some embodiments, the first path including the single path or the plurality of continuous paths enables the first movable apparatus to return to the global path of the task. The global path is obtained through calculation by the scheduling system before the first movable apparatus executes the task, and is used for the first movable apparatus to execute the task. In some embodiments, the global path is obtained through real-time calculation by the scheduling system when the first movable apparatus executes the task, and is used for the first movable apparatus to execute the task. The factor that affects normal driving of the first movable apparatus includes, for example, but not limited to, the obstacle, the derailment of the movable apparatus from the track, the electromagnetic interference, the terrain change, water or snow accumulation caused by the severe weather and the like. In some embodiments, in addition to calculating the first path, the first movable apparatus further calculates the time window or the control timing sequence corresponding to each of the first paths. The first movable apparatus calculates the time window corresponding to each of the first paths by using, for example, but not limited to, the earliest start time-latest end time algorithm, the priority-based time window allocation algorithm, and the genetic algorithm. In some embodiments, the first movable apparatus calculates the first path and the control timing sequence of the first path by using, for example, but not limited to, the Spatio-Temporal A* algorithm, the improved A* algorithm, and the Dijkstra algorithm.

Examples are given with reference to FIG. 2A, which is merely for ease of understanding and does not constitute a limitation on the present disclosure.

Example 1: it is assumed that the scheduling system 20 receives the task TASK1 from the external business system 10. Content of TASK1 is picking up goods from the node D and storing the goods to the node F. The scheduling system selects, for TASK1, an idle first movable apparatus 30*a* closest to a starting point of the task TASK1 to execute the task, and plans, for the first movable apparatus 30*a* by using the spatio-temporal search algorithm, the global path and the corresponding control timing sequence of the global path: <M3, T1>, <M4, T2>, where T1 is a time window of the path M3, T2 is a time window of the path M4, and T1=1, T2=2. When the first movable apparatus 30*a* is driving on the path M3, the obstacle 40 suddenly appears on the path M4 ahead. The sensor of the first movable apparatus 30*a* is configured to sense the obstacle 40 appearing on the path M4, and calculate the first path in response to detecting the obstacle 40 that affects normal driving of the first movable apparatus 30*a*, so that the first movable apparatus 30*a* is avoided from being affected by the obstacle 40 to continue to execute the task TASK1. The first movable apparatus 30*a* calculates the first path Q: <M22, T3>, <M6, T4>, <M18, T5>, where T3, T4, and T5 are time windows of M22, M6, and M18, respectively, and T3=2, T4=3, and T5=4. The scheduling system receives the first path Q: <M22, T3>, <M6, T4>, <M18, T5> from the first movable apparatus 30*a*.

In action S102: calculate whether the first path conflicts with the second path of each of second movable apparatuses in the working area.

As described above, the second movable apparatus is similar to the movable apparatus 30. The second movable apparatus is a movable apparatus in the working area W other than the first movable apparatus 30*a*. In some embodiments, the second movable apparatus and the first movable apparatus are of the same type or different types. The number of the second movable apparatuses is one or more. In some embodiments, the second movable apparatus executes the task that is the same as or different from that of the first movable apparatus in the working area. The second path includes at least the current driving path and the planned but undriven paths. In some embodiments, the second path is the global path planned by the scheduling system for the movable apparatus to execute the task. In some embodiments, the second path is the control path calculated by the scheduling system for the movable apparatus to execute the task. In some embodiments, the second path is the local path calculated by the movable apparatus. In some embodiments, the movable apparatus or the scheduling system calculates the second path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent the Graph method, the Breadth-First Search (BFS) algorithm, or the Depth-First Search (DFS) algorithm. In some embodiments, the second path is calculated by the movable apparatus, and the second path is calculated by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent the Graph method, the Breadth-First Search (BFS) algorithm, or the Depth-First Search (DFS) algorithm.

In some embodiments, calculating whether the first path conflicts with the second path is determined by determining whether the two paths conflict in the time dimension and the space dimension. In some embodiments, the scheduling system calculates, by using, for example, but not limited to, a space projection method or a bounding-volume method, whether the first path conflicts with the second path of each of the second movable apparatuses in the working area in the space dimension. In some embodiments, the scheduling system calculates, by using, for example, but not limited to, a time window analysis method, a time sequence method, a conflict graph method, or a path search algorithm combination method, whether the first path conflicts with the second path of each of the second movable apparatuses in the working area in the time dimension.

Examples are given with reference to FIG. 2A, which is merely for ease of understanding and does not constitute a limitation on the present disclosure.

Example 1 continues to be used: it is assumed that when the first movable apparatus 30*a* executes TASK1 and before the scheduling system receives the first path Q of the first movable apparatus 30*a*, the scheduling system further receives the task TASK2. Content of TASK2 is picking up goods from the node G and storing the goods to the node A. The scheduling system selects, for TASK2, an idle second movable apparatus 30*b* closest to a starting point of the task TASK2 to execute the task, and plans, for the second movable apparatus 30*b* by using the spatio-temporal search algorithm, the global path and the corresponding control timing sequence of the global path: <M14, T6>, <M13, T7>, where T6 is a time window of the path M14, T7 is a time window of the path M13, and T6=1, T7=2. After the scheduling system receives the first path Q: <M22, T3>, <M6, T4>, <M18, T5> from the first movable apparatus 30*a*, the scheduling system calculates whether the first path Q: <M22, T3>, <M6, T4>, <M18, T5> conflicts with the second path <M14, T6>, <M13, T7> of the second movable apparatus 30*b* in the working area W. It is found by the scheduling system through calculation that the first path Q: <M22, T3>, <M6, T4>, <M18, T5> does not conflict with the second path <M14, T6>, <M13, T7> of the second movable apparatus 30*b* in the working area W.

In action S103: determine, based on at least the calculated result, first information for controlling the first movable apparatus to drive. The first movable apparatus is configured to determine, based on the first information, which action to perform. Referring to FIG. 5, the determining, based on at least the calculated result, the first information for controlling the first movable apparatus to drive further includes action S1031*a*, action S1032*a*, and action S1033*a*.

If the calculated result is no conflict, that is, the first path of the first movable apparatus does not conflict with the second path of the second movable apparatus, action S1031*a* is performed: determine that the first information is a message allowing to use the first path.

If the calculated result is the conflict, that is, the first path of the first movable apparatus conflicts with the second path of the second movable apparatus, action S1032*a* is performed. In action S1032*a*, the scheduling system calculates a third path. The third path avoids the first movable apparatus from being affected by the factor to continue to execute the task, and the third path does not conflict with the second path of each of the second movable apparatuses. The calculated third path includes a single path or a plurality of continuous paths. In some embodiments, the third path including the single path or the plurality of continuous paths is a path provided for the first movable apparatus to drive bypassing the obstacle. In some embodiments, the third path including the single path or the plurality of continuous paths is a new path that the first movable apparatus enters after leaving the derailed track. In some embodiments, the third path including the single path or the plurality of continuous paths enables the first movable apparatus to return to the global path of the task. The third path is different from the first path. In some embodiments, the third path is calculated based on at least the following factors: the current location of the first movable apparatus, the maximum driving speed of the first movable apparatus, and the braking ability of the first movable apparatus, to enable the first movable apparatus to accelerate to the maximum speed with sufficient efficiency, and to brake after reaching the maximum speed and stop stably at the end of the current driving path. In some embodiments, the scheduling system calculates the third path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent the Graph method, the Breadth-First Search (BFS) algorithm, or the Depth-First Search (DFS) algorithm.

After action S1032*a* is performed, action S1033*a* is performed: determine that the first information includes the third path. In some embodiments, it is determined that the first information includes the third path and a message rejecting the first path.

Examples are given with reference to FIG. 2A, which is merely for ease of understanding and does not constitute a limitation on the present disclosure.

Example 1 continues to be used: the scheduling system determines that the first information is a message allowing to use the first path Q: <M22, T3>, <M6, T4>, <M18, T5>.

Example 2: It is assumed that before receiving the first path Q of the first movable apparatus 30*a*, the scheduling system further completes planning for the task TASK3 in addition to completing planning of the TASK2. Content of the task TASK3 is picking up goods from the node G and storing the goods to the node I. The scheduling system selects an idle second movable apparatus 30*e* closest to the task TASK3 to execute the task, and plans, for the second movable apparatus 30*e* by using the spatio-temporal search algorithm, the global path and the corresponding control timing sequence of the global path: <M5, T8>, <M6, T9>, where T8 is a time window of the path M5, T9 is a time window of the path M6, and T8=2, T9=3. After receiving the first path Q of the first movable apparatus 30*a*, the scheduling system further calculates whether the first path Q: <M22, T3>, <M6, T4>, <M18, T5> conflicts with the second path <M5, T8>, <M6, T9> of the second movable apparatus 30*e* in addition to calculating whether the first path Q: <M22, T3>, <M6, T4>, <M18, T5> conflicts with the second path <M14, T6>, <M13, T7> of the second movable apparatus 30*b* in the working area W. The scheduling system finds that M6 in the first path Q conflicts with the path M6 of the second movable apparatus 30*e* in the working area W. The scheduling system further calculates the third path, and obtains the third path E: <M15, T10>, <M2, T11>, <M23, T12>, where T10 is a time window of the path M15, T11 is a time window of the path M2, and T12 is a time window of the path M23. The scheduling system determines that the first information includes the third path E: <M15, T10>, <M2, T11>, <M23, T12> and the message rejecting the first path Q.

Return to FIG. 4, after action S103 is performed, action S104 is performed: send the determined first information to the first movable apparatus. In some embodiments, the scheduling system sends the first information to the first movable apparatus. In some embodiments, the scheduling system sends the first information to the RCS, and the RCS sends the received first path to the first movable apparatus.

Examples are given with reference to FIG. 2A, which is merely for ease of understanding and does not constitute a limitation on the present disclosure.

Example 1 continues to be used: the scheduling system is configured to send the first information to the first movable apparatus 30*a*, in which the first information is a message allowing to use the first path Q: <M22, T3>, <M6, T4>, <M18, T5>.

Example 2 continues to be used: the scheduling system is configured to send the first information to the first movable apparatus 30*a*, in which the first information includes the third path E: <M15, T10>, <M2, T11>, <M23, T12> and a message rejecting the first path Q.

Embodiments of the present disclosure use the scheduling system to perform global path planning for movable apparatuses, and allow the movable apparatuses to calculate the local paths that enable the movable apparatuses to avoid being affected by the factors and continue to execute the task in response to the discovery of factors that affect the normal driving of the movable apparatuses during real-time operation. In this way, it not only takes into account the efficiency based on global planning during the operation of multiple vehicles, but also achieves a flexible response to the operating environment, and improves the response speed and response ability to the dynamic changes. At the same time, in the embodiments of the present disclosure, by making the movable apparatuses apply to the scheduling system for whether the local path is available, and the scheduling system examines whether the local path can be used by calculating whether the local path conflicts with the path of each of the other movable apparatuses in the working area, it effectively avoids collisions and interferences between movable apparatuses while improving the response ability, prevents deadlocks, and overcomes the problems of lacking global scheduling and being unable to balance the operating efficiency of multiple vehicles when the passage path is calculated only by the movable apparatus. Moreover, when the scheduling system detects that the path calculated by the movable apparatus conflicts with other paths, the scheduling system calculates a new local path for the movable apparatus to avoid being affected by factors and continue to execute the task, ensuring the feasibility of the path and the efficiency of path adjustment.

Figure 6:
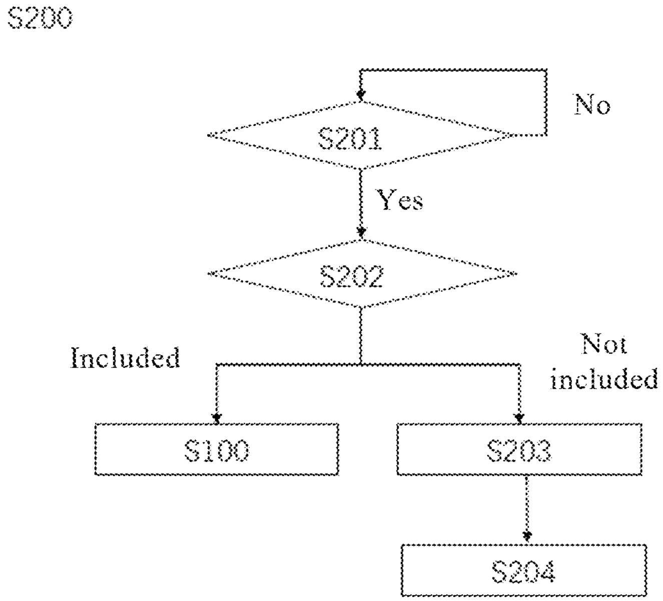
FIG. 6 is a flowchart of a scheduling method according to another embodiment of the present disclosure.

FIG. 6 is a flowchart of a scheduling method S200 according to another embodiment of the present disclosure. The present disclosure does not limit the actions to be performed completely according to action sequences shown in FIG. 6, provided that an approximately same result can be obtained. The objects that the scheduling method S200 is used for scheduling are consistent with those of the scheduling method S100.

As shown in FIG. 6, action S200 starts with action S201: the scheduling system is configured to monitor whether second information from the first movable apparatus is received. In some embodiments, the second information includes, for example, but not limited to, location information of the first movable apparatus, task execution status information, device status information, or obstacle detection information. In some embodiments, the second information includes the first path of the first movable apparatus. Monitoring continues if the second information is not received. If the second information is received, action S202 is performed.

In action S202, the scheduling system is configured to determine whether the second information includes the first path. If the first path is included, the scheduling method S100 is performed. If the first path is not included, action S203 is performed.

In action S203, the scheduling system is configured to determine whether the first movable apparatus completes the task. If the task is completed, a fourth path is calculated. The fourth path is used for the first movable apparatus to continue to execute the task and does not conflict with the second path of each of second movable apparatuses. In some embodiments, the fourth path is the control path. In some embodiments, the fourth path is calculated based on at least the following factors: the current location, the maximum driving speed, and the braking ability of the first movable apparatus, to enable the first movable apparatus to accelerate to the maximum speed with sufficient efficiency, and to brake after reaching the maximum speed and stop at the end of the current driving path. In some embodiments, the scheduling system calculates the fourth path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent the Graph method, the Breadth-First Search (BFS) algorithm, or the Depth-First Search (DFS) algorithm.

In action S204, the scheduling system is configured to send third information to the first movable apparatus. In some embodiments, the third information includes a fourth path. In some embodiments, the third information includes the fourth path and the message rejecting the first path. In some embodiments, even if the scheduling system does not receive the first path, the third information sent by the scheduling system also includes the message rejecting the first path.

Examples are given with reference to FIG. 2A, which is merely for ease of understanding and does not constitute a limitation on the present disclosure.

Example 1 continues to be used: after the scheduling system sends, to the first movable apparatus 30*a*, the first information of the message allowing to use the first path Q: <M22, T3>, <M6, T4>, <M18, T5>, the first movable apparatus 30*a* sequentially drives along the paths M22, M6, and M18. When driving to the end of the path M18, the first movable apparatus 30*a* sends the second information including the location information and the task execution status information to the scheduling system. The scheduling system continuously monitors whether the second information from the first movable apparatus 30*a* is received. After monitoring that the second information is received, the scheduling system determines that the second information of the first movable apparatus 30*a* does not include the first path, and the first movable apparatus 30*a* has completed the task.

Example 2 continues to be used: When the second movable apparatus 30*e* drives to the end of the path M5, the second movable apparatus 30*e* sends the second information including the location information and the task execution status information to the scheduling system. The scheduling system continuously monitors whether the second information from the second movable apparatus 30*e* is received. After monitoring that the second information is received, the scheduling system determines that the second information of the second movable apparatus 30*e* does not include the first path, and the first movable apparatus 30*a* does not complete the task. The scheduling system calculates the fourth path that is used for the second movable apparatus 30*e* to continue to execute the task and that does not conflict with the path <M15, T10>, <M2, T11>, <M23, T12> of the first movable apparatus 30*a* and the path <M14, T6>, <M13, T7> of the second movable apparatus 30*b*. The calculated fourth path is M6. The scheduling system is configured to send third information including the fourth path M6 to the second movable apparatus 30*e*.

Figure 7A:
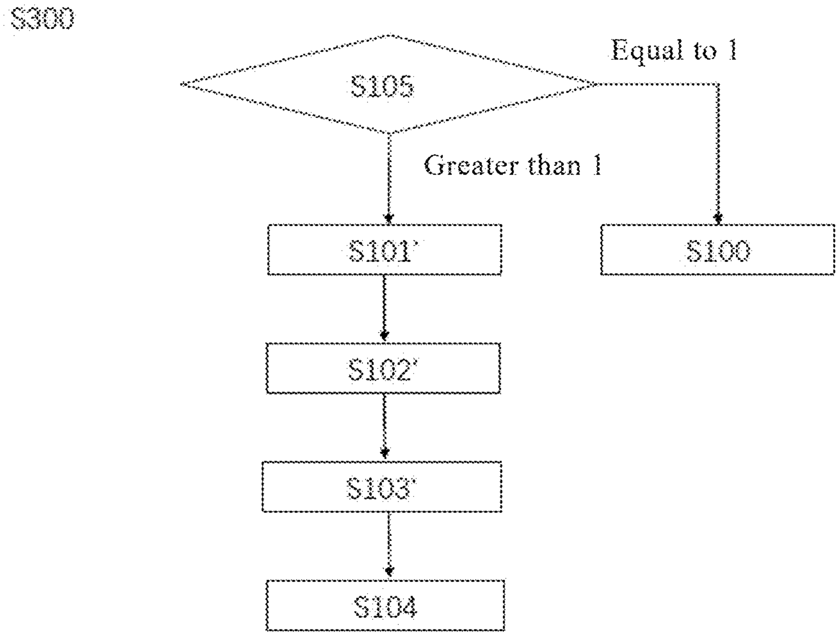
FIG. 7A is a flowchart of a scheduling method according to another embodiment of the present disclosure.
Figure 7B:
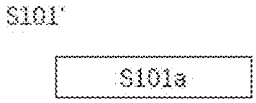
FIG. 7B is a detailed schematic diagram of action S101' in the scheduling method according to the embodiment shown in FIG. 7A.
Figure 7C:
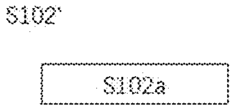
FIG. 7C is a detailed schematic diagram of action S102' in the scheduling method according to the embodiment shown in FIG. 7A.
Figure 7D:
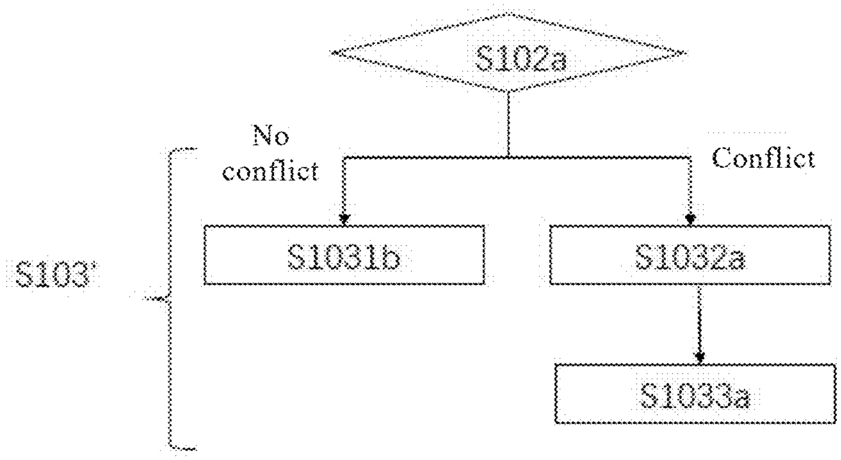
FIG. 7D is a detailed flowchart of action S102' and action S103' in the scheduling method according to the embodiment shown in FIG. 7A.

FIG. 7A is a flowchart of a scheduling method S300 according to another embodiment of the present disclosure. FIG. 7B is a detailed schematic diagram of action S101' in the scheduling method S300 according to one embodiment shown in FIG. 7A. FIG. 7C is detailed schematic diagram of action S102' in the scheduling method S300 according to one embodiment shown in FIG. 7A. FIG. 7D is a detailed schematic diagram of action S102' and action S103' in the scheduling method S300 according to one embodiment shown in FIG. 7A. The present disclosure does not limit the actions to be performed completely according to action sequences shown in FIG. 7A to FIG. 7D, provided that an approximately same result can be obtained. The objects that the scheduling method S300 is used for scheduling are consistent with those of the scheduling method S100.

As shown in FIG. 7A, the scheduling method S300 starts with action S105.

In action S105, the scheduling system is configured to determine that the number of the first paths is equal to 1 or greater than 1. If the scheduling system is configured to determine that the number of the first paths is equal to 1, the scheduling method S100 is performed. If the scheduling system is configured to determine that the number of the first paths is greater than 1, action S101' is performed.

In action S101', the scheduling system is configured to receive the first path from the first movable apparatus, and the receiving the first path from the first movable apparatus further includes action S101*a*: the scheduling system is configured to determine priority information of each first path. In some embodiments, the scheduling system is configured to determine the number of the first paths and the priority information of each of the first paths. The priority information indicates a priority ranking of the first path. The priority information is determined based on a series of complex and key factors. In some embodiments, the priority information is determined by the movable apparatus based on factors such as a length of the path, an estimated driving time, an urgent degree of shipped goods, and/or a risk condition that exists on the path. By comprehensively considering these factors, the movable apparatus is configured to determine a proper priority for each of the first paths. The first path with a highest priority ranking is a path to be considered first. This means that in the plurality of first paths, the first path with a highest priority ranking has a highest weight and priority. The scheduling system preferentially analyzes whether the first path with the highest priority is feasible, to satisfy an overall efficient operation requirement of the system. If the first path with the highest priority does not conflict with the paths of other movable apparatuses, the scheduling system arranges the first movable apparatus to drive along this path.

Next, action S102' is performed.

In action S102', the scheduling system is configured to calculate whether the first path Q conflicts with the second path of each of the second movable apparatuses in the working area W, and the calculating whether the first path Q conflicts with the second path of each of the second movable apparatuses in the working area W further includes action S102*a*: the scheduling system is configured to calculate whether the corresponding first path conflicts with the second path of each of the second movable apparatuses in a descending order of the priority ranking. Calculation is stopped when a result that the first path does not conflict with the second path of each of the second movable apparatuses is obtained for the first time. Because a feasible path has been found in this case, additional calculation resources and time is consumed if other paths continue to be calculated. In this case, the scheduling system stops calculation and enters the next action to improve operation efficiency.

If the scheduling system obtains through calculation that a conflict exists between the first path corresponding to the current priority and the second path of each of the second movable apparatuses, the scheduling system is configured to continue to calculate whether there is a conflict between the first path of the next priority ranking and the second path of each of the second movable apparatuses, until a result of no conflict is obtained or until the first path with a lowest priority is calculated. In this process, once the scheduling system detects the first path with no conflict, the scheduling system stops calculating.

Next, action S103' is performed.

In action S103', the scheduling system is configured to determine, based on the calculated result, first information for controlling the first movable apparatus to drive, and the determining, based on the calculated result, the first information for controlling the first movable apparatus to drive further includes action S1031*b*: the scheduling system is configured to determine, when the result that the first path does not conflict with the second path of each of the second movable apparatuses is obtained for the first time, that the first information is a message indicating to use the first path corresponding to the non-conflict result that is obtained for the first time.

That the scheduling system is configured to determine, based on the calculated result, the first information for controlling the first movable apparatus to drive further includes action S1032*a* and action S1033*a*.

In action S1032*a*, if all the first paths conflict with the second path of each of the second movable apparatuses, the scheduling system is configured to calculate the third path. In action S1033*a*, the scheduling system is configured to determine that the first information includes the third path. In some embodiments, the scheduling system is configured to determine that the first information includes the third path and a message rejecting the first path.

Next, action S104 is performed. Step S104 is described above, and details are not described herein again.

Examples are given with reference to FIG. 2A, which is merely for ease of understanding and does not constitute a limitation on the present disclosure.

Example 3: different from example 1, the first movable apparatus 30*a* calculates two first paths Q, that is, a 1st first path Q1: <M22, T3>, <M6, T4>, <M18, T5>, and a 2nd second path Q2: <M15, T3'>, <M6, T4'>, <M18, T5'>. In addition, the first movable apparatus 30*a* sets priority information to 1 for the first path Q1 and sets priority information to 2 for the second path Q2. After the scheduling system receives the first path Q1 and the first path Q2, the scheduling system is configured to determine that the number of the first paths is greater than 1, and determine that the number of the first paths is 2. The scheduling system is configured to determine that the priority information of the first path Q1 is 1, and the priority information of the first path Q2 is 2. Because the priority information 1 of the first path Q1 ranks higher than the priority information 2 of the first path Q2, the scheduling system is configured to first calculate whether the first path Q1 conflicts with the second path <M14, T6>, <M13, T7> of the second movable apparatus 30*b*. The calculated result is no conflict, calculation is stopped, and it is determined that the first information is a message that indicates to use the first path Q1. If the calculated result is the conflict, it is calculated whether the first path Q2 conflicts with the second path <M14, T6>, <M13, T7> of the second movable apparatus 30*b*. If the calculated result is no conflict, calculation is stopped, and it is determined that the first information is a message that indicates to use the first path Q2. If the calculated result is the conflict, the scheduling system calculates the third path, and determines that the first information includes the third path, or the third information includes the third path and a message rejecting the first paths Q1 and Q2.

Figure 8:
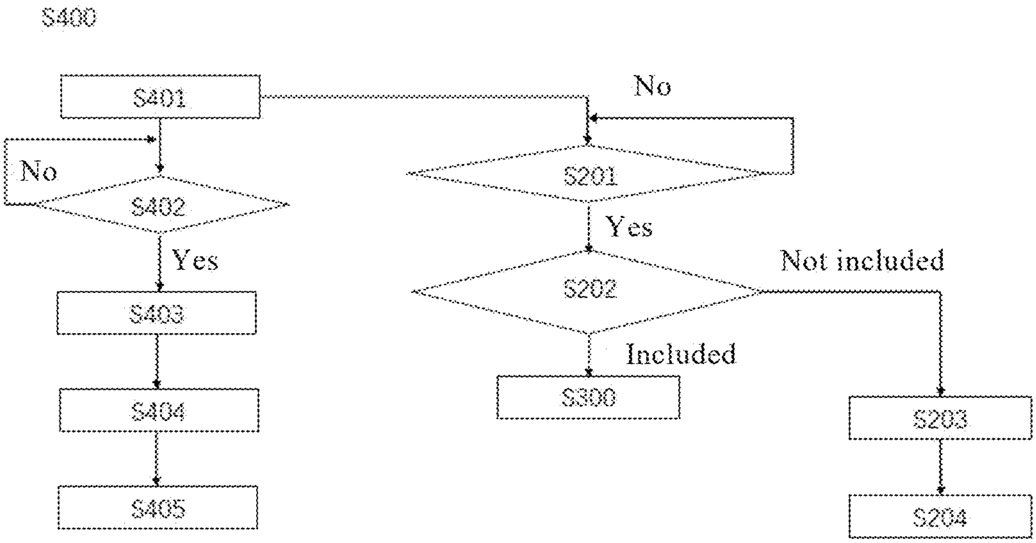
FIG. 8 is a flowchart of a scheduling method according to another embodiment of the present disclosure.

FIG. 8 is a flowchart of a scheduling method S400 according to another embodiment of the present disclosure. The present disclosure does not limit the actions to be performed completely according to action sequences shown in FIG. 8, provided that an approximately same result can be obtained. The objects that the scheduling method S400 is used for scheduling are consistent with those of the scheduling method S100.

As shown in FIG. 8, in addition to action S201, action S202, action S203, action S204, and the scheduling method S300 described above, the scheduling method S400 further includes action S401, action S402, action S403, action S404, and action S405.

In action S401, the scheduling system is configured to load map information of the working area, and communicate with the movable apparatuses in the working area. This action is at a stage of of initializing the system. After action S401, action S201 is performed: the scheduling system is configured to monitor whether the second information from the first movable apparatus is received. If the second information is not received, the scheduling system is configured to continue to perform action S201, to continue to monitor the status of the first movable apparatus. If the second information is received, action S202 is performed: the scheduling system is configured to determine whether the second information includes the first paths. If the first paths are not included, action S203 and action S204 are performed. If the first paths are included, the method S300 is performed.

In action S402, the scheduling system is configured to monitor whether task information about the task from, for example, but not limited to, an external business system is received. If the task information is received, action S403 is performed. If the task information is not received, the scheduling system is configured to continue to monitor whether new task information is received.

In action S403, the scheduling system is configured to select, based on at least the task information, the first movable apparatus to be used for executing the task. The scheduling system is configured to select an idle movable apparatus closest to a starting point of the task to execute the task. In some embodiments, the scheduling system is configured to select any proper movable apparatus to execute the task.

In action S404, the scheduling system is configured to calculate the global path and the control timing sequence of the global path for executing the task. The calculated global path and the control timing sequence of the global path ensure that there is no path conflict relationship between any two movable apparatuses at the same moment on a timeline, so as to ensure reliability of the entire system and shorten the time to complete the task as much as possible, thereby improving working efficiency. In some embodiments, the scheduling system calculates the global path by using, for example, but not limited to, the Rapid Random Tree (RRT) algorithm and the variant thereof, the real-time obstacle avoidance algorithm based on sensor information, the Dynamic Window Approach, the Artificial Potential Field method, the Spatio-Temporal Search algorithm, the Spatio-Temporal A* algorithm, the improved A* algorithm, the Dijkstra algorithm, the Genetic algorithm, the Ant Colony Optimization algorithm, the Particle Swarm Optimization algorithm, the Visibility Graph method, the Tangent the Graph method, the Breadth-First Search (BFS) algorithm, or the Depth-First Search (DFS) algorithm. In some embodiments, the scheduling system calculates the global path and the control timing sequence of the global path by using, for example, but not limited to, the Spatio-Temporal A* algorithm, the improved A* algorithm, and the Dijkstra algorithm. In some embodiments, the scheduling system calculates the control timing sequence of the global path by using, for example, but not limited to, the earliest start time-latest end time algorithm, a priority-based time window allocation algorithm, and a genetic algorithm.

In action S405, the scheduling system is configured to send the global path and the control timing sequence of the global path to the first movable apparatus.

The embodiments of the present disclosure take into account both global planning and rapid response to dynamic changes by enabling the scheduling system to plan the global path and the control timing sequence of the global path, and to review the local paths calculated by the movable apparatuses. This achieves the efficiency optimization at the level of the multi-vehicle system and improves the operation efficiency.

Figure 9:
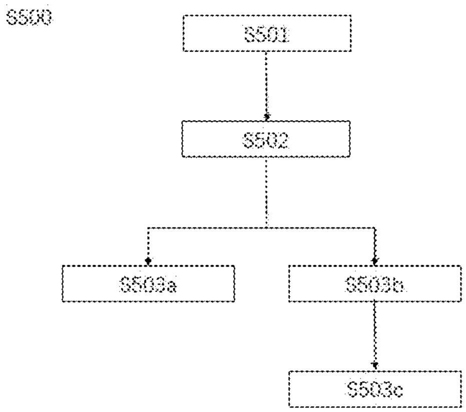
FIG. 9 is a flowchart of a scheduling method according to one embodiment of the present disclosure.
Figure 10:
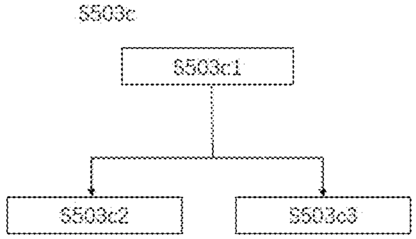
FIG. 10 is a detailed flowchart of action S503*c* in the scheduling method according to the embodiment shown in FIG. 9.

FIG. 9 is a flowchart of a scheduling method S500 according to one embodiment of the present disclosure. FIG. 10 is a detailed flowchart of action S503*c* in the scheduling method S500 according to the embodiment shown in FIG. 9. The present disclosure does not limit the actions to be performed completely according to action sequences shown in FIG. 9 and FIG. 10, provided that an approximately same result can be obtained. The scheduling method S500 is used for any intelligent movable apparatus, for example, but not limited to, the mobile robots, the autonomous mobile devices, the unmanned aerial vehicles, the material handling equipments, the automated guided forklifts and the like. The mobile robot includes, for example, but not limited to, the AGVs, the AMRs, the humanoid robots, the mopping robots, the sweeping robots, the agricultural robots, the patrol robots and the like. The autonomous mobile device includes, for example, but not limited to, the intelligent vehicles and the intelligent electric vehicles.

As shown in FIG. 9, the scheduling method S500 starts with action S501.

In action S501, the first movable apparatus is configured to send the first paths to the scheduling system. In some embodiments, the first movable apparatus is configured to send the first paths to the RCS, and the RCS sends the first paths to the scheduling system. The first paths are calculated by the first movable apparatus in response to detecting the factor that affects normal driving of the first movable apparatus, to avoid the first movable apparatus from being affected by the factor to continue to execute the task. The number of the first paths is equal to 1 or greater than 1. When the number of the first paths is greater than 1, the first movable apparatus is configured to configure priority information for each of the first paths. The priority information is determined based on a series of complex and key factors. In some embodiments, the priority information is determined by the movable apparatus based on factors such as a length of the path, the estimated driving time, the urgent degree of the shipped goods, and/or the risk condition that exists on the path. The priority information indicates a priority ranking of the first path. The first path with a highest priority ranking is a path to be considered first.

In action S502, the first movable apparatus is configured to determine whether the message allowing to use the first path is received. Step S503*a* is performed if the message allowing to use the first path is received. Step S503*b* is performed if the message allowing to use the first path is not received.

In action S503*a*, in a case that the message allowing to use the first path is received, the first movable apparatus is configured to drive along the first path.

In action S503*b*, in a case that the message allowing to use the first path is not received, the first movable apparatus is configured to stop driving, and is configured to receive first information for controlling the first movable apparatus to drive.

In action S503*c*, after receiving the first information, the first movable apparatus is configured to determine an operation of the first movable apparatus based on the first information.

More specifically, as shown in FIG. 10, action S503*c* further includes action S503*c*1, action S503*c*2, and action S503*c*3.

In action S503*c*1, the determining the operation of the first movable apparatus based on the first information further includes: when the first movable apparatus is configured to determine that the first information includes the third path, the first movable apparatus is configured to drive along the third path. In some embodiments, when the first movable apparatus determines that the first information includes the third path and the message rejecting the first path, the first movable apparatus is configured to drive along the third path. The third path is used to avoid the first movable apparatus from being affected by the factor to continue to execute the task, and the third path does not conflict with the second path of each of the second movable apparatuses in the working area. The third path is calculated by the scheduling system and is different from the first path. The calculated third path includes the single path or the plurality of continuous paths.

In action S503*c*2, if the first movable apparatus receives no indication about a new path when reaching the end of the third path, the first movable apparatus is configured to stop driving. In some embodiments, the first movable apparatus is further configured to send the second information to the scheduling system. In some embodiments, the second information includes, for example, but not limited to, the location information of the first movable apparatus, the task execution status information, the device status information, or the obstacle detection information.

In action S503*c*3, if the first movable apparatus receives the indication about the new path when reaching the end of the third path, the first movable apparatus is configured to continue to drive based on the indication about the new path. The first movable apparatus is configured to send the second information to the scheduling system after completing driving on the new path.

Examples are given with reference to FIG. 2A, which is merely for ease of understanding and does not constitute a limitation on the present disclosure.

Example 1 continues to be used: the first movable apparatus 30*a* is configured to send the first path Q: <M22, T3>, <M6, T4>, <M18, T5> to the scheduling system. It is determined by the scheduling system through calculation that the first path Q: <M22, T3>, <M6, T4>, <M18, T5> is used. The first movable apparatus 30*a* is configured to determine that the message allowing to use the first path Q: <M22, T3>, <M6, T4>, <M18, T5> is received, and the first movable apparatus 30*a* is configured to drive along the first path Q: <M22, T3>, <M6, T4>, <M18, T5>, and send the second information including the location information and the task execution status information to the scheduling system after completing driving on the first path Q: <M22, T3>, <M6, T4>, <M18, T5>.

Example 2 continues to be used: the first movable apparatus 30*a* is configured to send the first path Q: <M22, T3>, <M6, T4>, <M18, T5> to the scheduling system. It is determined by the scheduling system through calculation that the first path Q: <M22, T3>, <M6, T4>, <M18, T5> conflicts with the path M6 of the second movable apparatus 30*e*. The first movable apparatus 30*a* is configured to determine that no message allowing to use the first path Q: <M22, T3>, <M6, T4>, <M18, T5> is received, and the first movable apparatus 30*a* is configured to stop driving. The scheduling system sends the first information including the third path E: <M15, T10>, <M2, T11>, <M23, T12> and the message rejecting the first path Q to the first movable apparatus 30*a*. The first movable apparatus 30*a* is configured to receive the first information, and determine that the first information includes the third path E: <M15, T10>, <M2, T11>, <M23, T12> and the message rejecting the first path Q. The first movable apparatus 30*a* is configured to drive along the third path E based on the first information. Moreover, after completing driving on the third path E, the first movable apparatus 30*a* is configured to send the second information including the location information and the task execution status information to the scheduling system.

The embodiments of the present disclosure design the movable apparatus to calculate the local path that makes the movable apparatus to be free from the influence of the factors affecting its normal driving and to continue executing the task in response to the discovery of such factors, which improves the response speed and response ability to the dynamic changes. At the same time, in the embodiments of the present disclosure, the scheduling system calculates whether there is the conflict between the local path and the path of each of the other movable apparatuses in the working area, so as to ensure whether the local path can be used. While providing the response ability, it effectively avoids collisions and interferences among the movable apparatuses and prevents the occurrence of deadlocks. Moreover, the embodiments of the present disclosure makes the scheduling system to have more flexibility in path selection and improve the operation efficiency by making the movable apparatus to calculate the multiple local paths and configure priority information for each local path.

Figure 11:
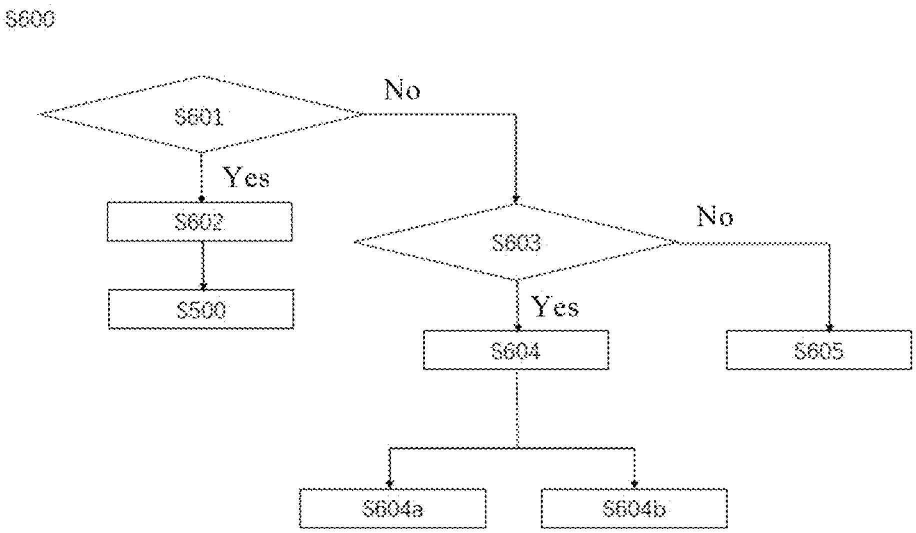
FIG. 11 is a flowchart of a scheduling method according to another embodiment of the present disclosure.

FIG. 11 is a flowchart of a scheduling method S600 according to another embodiment of the present disclosure. The present disclosure does not limit the actions to be performed completely according to action sequences shown in FIG. 11, provided that an approximately same result can be obtained. As shown in FIG. 11, the scheduling method S600 starts with action S601.

In action S601, the first movable apparatus is configured to detect, by using the sensor, whether the factor exists.

If the factor exists, action S602 is performed. If the factor does not exist, action S603 is performed.

In action S602, if the first movable apparatus is configured to detect that the factor exists, the first movable apparatus is configured to calculate the first path. Next, the scheduling method S500 is performed.

In action S603, the first movable apparatus is configured to determine whether the third information is received. The third information includes the fourth path. In some embodiments, the third information includes the fourth path and the message rejecting the first path. The fourth path is used for the first movable apparatus to continue to execute the task and does not conflict with the second path of each of the second movable apparatuses. In some embodiments, the fourth path is the control path. If the first movable apparatus is configured to determine that the third information is received, action S604 is performed. If the first movable apparatus is configured to determine that the third information is not received, action S605 is performed.

In action S604, after the first movable apparatus is configured to determine that the third information is received, the first movable apparatus is configured to drive along the fourth path.

In action S605, when the first movable apparatus has determined that the third information is not received, the first movable apparatus is configured to stop driving.

The scheduling method S600 further includes: action S604*a* and action S604*b*.

Follow action S604, if the first movable apparatus receives no indication about the new path when reaching the end of the fourth path calculated by the scheduling system, action S604*a* is performed: the first movable apparatus is configured to stop driving. In some embodiments, the first movable apparatus is configured to send the second information of the first movable apparatus to the scheduling system.

If the first movable apparatus receives the indication about the new path when reaching the end of the fourth path calculated by the scheduling system, action S604*b* is performed: the first movable apparatus is configured to continue to drive based on the indication about the new path. Moreover, the first movable apparatus is configured to send the second information of the first movable apparatus to the scheduling system after completing driving on the new path.

Examples are given with reference to FIG. 2A, which is merely for ease of understanding and does not constitute a limitation on the present disclosure.

Example 1 continues to be used: when the first movable apparatus 30*a* is driving on the path M3, the obstacle 40 suddenly appears on the path M4 ahead. The sensors of the first movable apparatus 30*a* is configured to sense the obstacle 40 appearing on the path M4, and the first movable apparatus 30*a* is configured to calculate the first path Q: <M22, T3>, <M6, T4>, <M18, T5> in response to detecting the obstacle 40 that affects the normal driving of the first movable apparatus 30*a*, and send the first path Q to the scheduling system.

Example 2 continues to be used: when the second movable apparatus 30*e* drives on the path M5, the sensors of the second movable apparatus 30*e* do not detect the factor that affects the normal driving of the second movable apparatus 30*e*. The second movable apparatus 30*e* is configured to determine whether the third information is received. If the second movable apparatus 30*e* receives, when reaching the end of the path M5, the third information that includes the fourth path M6 and rejecting the first path and that is sent by the scheduling system, the second movable apparatus 30*e* continues to drive along the path M6. If the second movable apparatus 30*e* receives, when reaching the end of the path M5, no third information that includes the fourth path and that is sent by the scheduling system, the second movable apparatus 30*e* stops driving.

Figure 12:
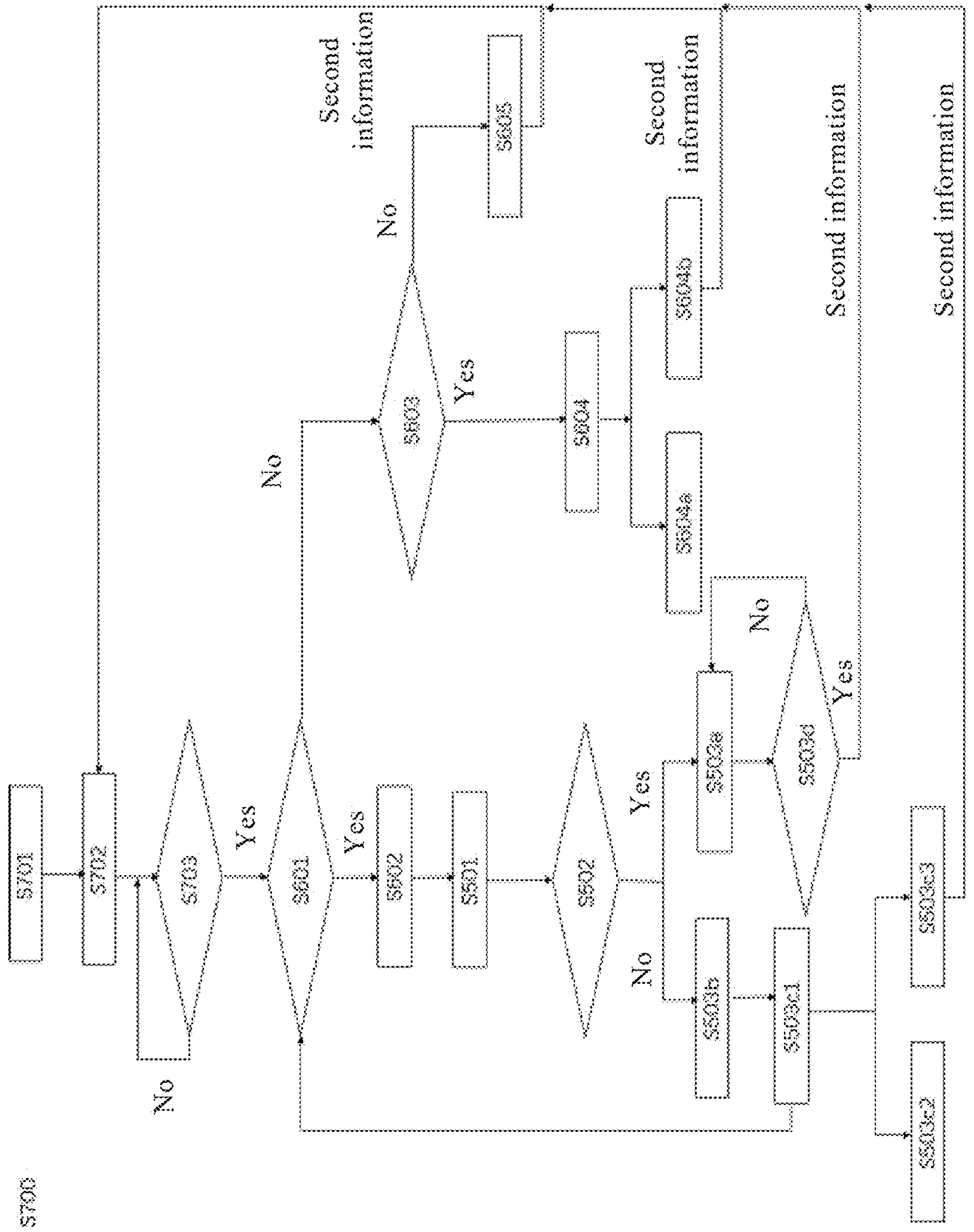
FIG. 12 is a flowchart of a scheduling method according to another embodiment of the present disclosure.

FIG. 12 is a flowchart of a scheduling method S700 according to another embodiment of the present disclosure. The present disclosure does not limit the actions to be performed completely according to action sequences shown in FIG. 12, provided that an approximately same result can be obtained. As shown in FIG. 12, the scheduling method S700 starts with action S701.

In action S701, the first movable apparatus is configured to initialize the sensors thereof. At least one of the sensors is configured to detect the working area. In some embodiments, the sensors of the movable apparatus 30 are configured to detect abnormal cases that affect normal working of the movable apparatus and that appears in the working area, such as the obstacle, the derailment of the movable apparatus from the track, the electromagnetic interference, the terrain change, and the water or snow accumulation caused by severe weather. In some embodiments, the sensors are, for example, but not limited to, the laser radars, the visual sensors, the inertial navigation sensors, the ultrasonic sensors, the infrared sensors, the laser obstacle avoidance sensors, the photoelectric sensors and the like.

Then, in action S702, the first movable apparatus is configured to communicate with the scheduling system and send the second information of the first movable apparatus to the scheduling system.

In action S703, the first movable apparatus is configured to continuously detect whether the task information from the scheduling system, and the global path and the control timing sequence of the global path for executing the task information are received. If received, the first movable apparatus is configured to start to execute the task based on the received task information, and the global path and the control timing sequence of the global path for executing the task information, and perform action S601. If not received, action S703 is repeated, to continue to detect whether the task information from the scheduling system, and the global path and the control timing sequence of the global path for executing the task information are received.

In action S601, the first movable apparatus is configured to detect, in real time by using the sensor, whether the factor that affects the normal driving of the first movable apparatus exists.

If the first movable apparatus detects that the factor exists, action S602 is performed: the first movable apparatus is configured to calculate the first path. Next, in action S501, the first movable apparatus is configured to send the first path to the scheduling system. Then, in action S502, the first movable apparatus is configured to determine whether the message allowing to use the first path is received. If the message is received, action S503*a* is performed: the first movable apparatus is configured to drive along the first path.

In addition, the scheduling method S700 further includes action S503*d*: the first movable apparatus is configured to monitor whether driving on the first path is completed. When the factor that affects the normal driving of the first movable apparatus remains unchanged and the first movable apparatus does not complete driving on the first path, the first movable apparatus is configured to continue to drive on the first path. When the first movable apparatus completes driving on the first path, the first movable apparatus is configured to send the second information to the scheduling system.

If the first movable apparatus is configured to determine that the message allowing to use the first path is not received, action S503*b* is performed. The first movable apparatus is configured to stop driving, and is configured to wait for receiving the first information for controlling the first movable apparatus to drive. Then, in action S503*c*1, when the first movable apparatus is configured to determine that the first information includes the third path, the first movable apparatus is configured to drive along the third path.

Next, if the first movable apparatus receives no indication about the new path when reaching the end of the third path, action S503*c*2 is performed: the first movable apparatus is configured to stop driving. In some embodiments, the first movable apparatus is further configured to send the second information to the scheduling system.

If the first movable apparatus receives the indication about the new path when reaching the end of the third path, action S503*c*3 is performed: the first movable apparatus is configured to continue to drive based on the indication about the new path. In addition, the first movable apparatus is configured to send the second information of the first movable apparatus to the scheduling system after completing driving on the new path.

Return to action S601. If the first movable apparatus does not detect that the factor exists, action S603 is performed.

In action S603, the first movable apparatus is configured to determine whether third information is received. The third information includes a fourth path.

If the third information is received, action S604 is performed: The first movable apparatus is configured to drive along the fourth path.

If the third information is not received, action S605 is performed: The first movable apparatus is configured to stop driving. In some embodiments, the first movable apparatus is further configured to send the second information to the scheduling system.

Return to action S604, if the first movable apparatus receives no indication about the new path when reaching an end of the fourth path calculated by the scheduling system, action **S604*a*** is performed: The first movable apparatus is configured to stop driving. In some embodiments, the first movable apparatus is configured to send the second information of the first movable apparatus to the scheduling system after stopping driving.

If the first movable apparatus receives the indication about the new path when reaching the end of the fourth path calculated by the scheduling system, action **S604*b*** is performed: The first movable apparatus is configured to continue to drive based on the indication about the new path. Moreover, the first movable apparatus is configured to send the second information of the first movable apparatus to the scheduling system after completing driving on the new path.

Figure 13:
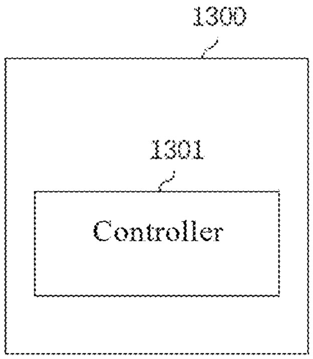
FIG. 13 is a schematic diagram of a scheduling system according to one embodiment of the present disclosure.

FIG. 13 is a schematic diagram of a scheduling system 1300 according to one embodiment of the present disclosure.

As shown in FIG. 13, the scheduling system 1300 includes a controller 1301. The scheduling system 1300 is similar to the scheduling system 20. In some embodiments, the scheduling system 1300 schedules, for example, but not limited to, any intelligent movable apparatus such as the mobile robots, the autonomous mobile devices, the unmanned aerial vehicles, the material handling equipments, and the automated guided forklifts. The mobile robot includes, for example, but not limited to, the AGVs, the AMRs, the humanoid robots, the mopping robots, the sweeping robots, the agricultural robots, the patrol robots and the like. The autonomous mobile device includes, for example, but not limited to, the intelligent vehicles and the intelligent electric vehicles. In some embodiments, the controller 1301 of the scheduling system 1300 includes the processor, the memory, the input/output interface, the mainboard, the peripheral circuit, the element, and the like at the hardware level. In some embodiments, the controller of the scheduling system 1300 typically includes the control algorithm, the operating system, the communication protocol, and the like at the software level. In some embodiments, the controller 1301 is a plug-and-play apparatus. In some embodiments, the controller 1301 is connected to a mobile apparatus in a wired or wireless manner. The controller 1301 of the scheduling system 1300 in this disclosure refer to a set of controllers configured to execute the same task or different tasks. The controller 1301 of the scheduling system 1300 is configured to implement the scheduling method described in FIG. 4 to FIG. 8 and any variation thereof without departing from the spirit of the present disclosure.

The scheduling system provided in the embodiments of the present disclosure plans the global path and the control timing sequence of the global path, and checks the local path calculated by the movable apparatus. In this way, the global planning and the quick response to the dynamic changes are considered, thereby implementing efficiency optimization at the multi-vehicle system level, and improving the operation efficiency.

Figure 14:
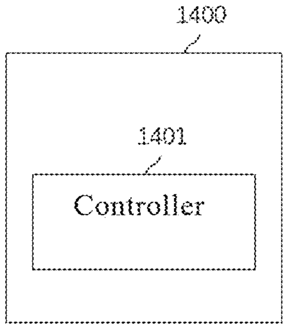
FIG. 14 is a schematic diagram of a movable apparatus according to another embodiment of the present disclosure.

FIG. 14 is a schematic diagram of a movable apparatus 1400 according to another embodiment of the present disclosure.

As shown in FIG. 14, the movable apparatus 1400 includes the controller 1401. The movable apparatus 1400 is similar to the movable apparatus 30. In some embodiments, the movable apparatus 1400 is, for example, but not limited to, any intelligent movable apparatus such as the mobile robots, the autonomous mobile devices, the unmanned aerial vehicles, the material handling equipments, and the automated guided forklifts. The mobile robot includes, for example, but not limited to, the AGVs, the AMRs, the humanoid robots, the mopping robots, the sweeping robots, the agricultural robots, the patrol robots and the like. The autonomous mobile device includes, for example, but not limited to, the intelligent vehicles and the intelligent electric vehicles. In some embodiments, the controller 1401 of the movable apparatus 1400 typically includes the processor, the memory, the input/output interface, the mainboard, the peripheral circuit, the element, and the like at the hardware level. In some embodiments, the controller of the scheduling system 1300 typically includes the control algorithm, the operating system, the communication protocol, and the like at the software level. In some embodiments, the controller 1401 is the plug-and-play apparatus. In some embodiments, the controller 1401 is connected to the mobile apparatus in the wired or wireless manner. The controller 1401 of the scheduling system 1400 in this disclosure refer to a set of controllers configured to execute the same task or different tasks. The controller 1401 of the movable apparatus 1400 is configured to implement the scheduling method described in FIG. 9 to FIG. 12 and any variation thereof without departing from the spirit of the present disclosure.

The embodiments of the present disclosure design the movable apparatus to calculate the local path that allows the movable apparatus to be free from the influence of the factors affecting its normal driving and to continue executing the task in response to the discovery of such factors, thereby improving the response speed and response ability to the dynamic changes. Moreover, the embodiments of the present disclosure endow the scheduling system with more flexibility in path selection and improve the operation efficiency by designing the movable apparatus to calculate the multiple local paths and configure the priority information for each local path.

Figure 15:
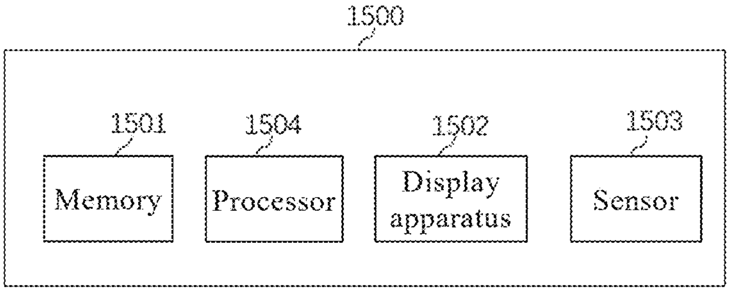
FIG. 15 is a schematic diagram of a movable apparatus according to another embodiment of the present disclosure.

FIG. 15 is a schematic diagram of a movable apparatus 1500 according to another embodiment of the present disclosure. The movable apparatus 1500 is similar to the movable apparatus 30. In some embodiments, the movable apparatus 1500 includes a memory 1501, a display apparatus 1502, a sensor 1503, and a processor 1504. In some embodiments, the processor 1504 is operatively coupled to the memory 1501, the display apparatus 1502, and the sensor 1503. In some embodiments, the processor 1504 implements, in cooperation with the memory 1501, the display apparatus 1502, and the sensor 1503, the scheduling method proposed in the present disclosure. In some embodiments, the processor 1504 is an integrated element. The processor 1504 includes a plurality of control units/processing units.

The processor 1504 is configured to load material information from the memory 1501. The processor 1504 stores the material information in the memory 1501. The processor 1504 receives and process an input (such as a touch operation) of a user on the display apparatus 1502 or data sensed by the sensor 1503. It should be noted that the present disclosure does not limit the processor 1504 to be implemented in hardware, software, or a combination of hardware/software.

In some embodiments, the memory 1501 is an integrated element. The memory 1501 is considered as including a plurality of storage units. Information such as, but not limited to, data information such as a point cloud path, a pose, and a key frame is separately stored in different storage units or stored in a same storage unit. In some embodiments, the display apparatus 1502 is a touchscreen. In some embodiments, the sensor 1503 is an integrated element. The sensor 1503 is considered as including a plurality of sensor elements. In some embodiments, the sensor 1503 includes common sensor elements such as a 3D laser radar, an odometer, a gyroscope, and an accelerometer.

The movable apparatus 1500 implements real-time data dynamic planning of the first path with cooperation of the sensor 1503 and the processor 1504, to avoid collision and improve operation efficiency. The movable apparatus 1500 is configured to implement the scheduling method described in FIG. 9 to FIG. 12 and any variation thereof without departing from the spirit of the present disclosure.

Figure 16:
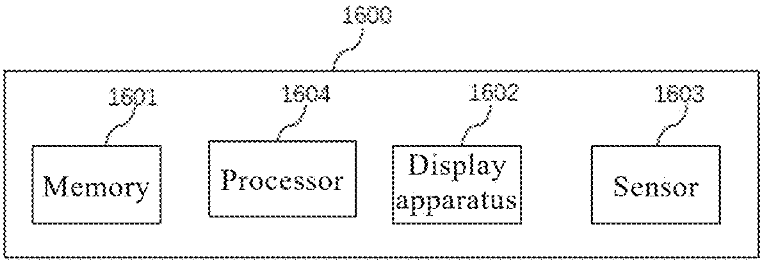
FIG. 16 is a schematic diagram of a scheduling system according to another embodiment of the present disclosure.

FIG. 16 is a schematic diagram of a scheduling system 1600 according to another embodiment of the present disclosure. The scheduling system 1600 is similar to the scheduling system 20. In some embodiments, the scheduling system 1600 includes a memory 1601, a display apparatus 1602, a sensor 1603, and a processor 1604. In some embodiments, the processor 1604 is operatively coupled to the memory 1601, the display apparatus 1602, and the sensor 1603. In some embodiments, the processor 1604 implements, in cooperation with the memory 1601, the display apparatus 1602, and the sensor 1603, the scheduling method proposed in the present disclosure. In some embodiments, the processor 1604 is an integrated element. The processor 1604 includes a plurality of control units/processing units. The processor 1604 is configured to load material information from the memory 1601. The processor 1604 stores the material information in the memory 1601. The processor 1604 receives and process an input (such as a touch operation) of a user on the display apparatus 1602 or data sensed by the sensor 1603. It should be noted that the present disclosure does not limit the processor 1604 to be implemented in hardware, software, or a combination of hardware/software.

In some embodiments, the memory 1601 is an integrated element. The memory 1601 is considered as including a plurality of storage units. Information such as, but not limited to, data information such as a point cloud path, a pose, and a key frame is separately stored in different storage units or stored in a same storage unit. In some embodiments, the display apparatus 1602 is a touchscreen. In some embodiments, the sensor 1603 is an integrated element. The sensor 1603 is considered as including a plurality of sensor elements. In some embodiments, the sensor 1603 includes common sensor elements such as a 3D laser radar, an odometer, a gyroscope, and an accelerometer.

The scheduling system 1600 implements real-time data dynamic planning of the first path with cooperation of the sensor 1603 and the processor 1604, to avoid collision and improve operation efficiency. The scheduling system 1600 is configured to implement the scheduling method described in FIG. 4 to FIG. 8 and any variation thereof without departing from the spirit of the present disclosure.

The foregoing summarizes features of several embodiments and details of the present disclosure. The embodiments described in the present disclosure can be easily used as a basis for designing or modifying other processes and a structure for performing the same or similar objectives and/or obtaining the same or similar advantages of the embodiments introduced in this disclosure. These equivalent structures do not depart from the spirit and scope of the present disclosure, and different changes, replacements, and changes is made without departing from the spirit and scope of the present disclosure.

We claim:

1. A scheduling method, comprising:

Via a scheduling system, receiving a first path from a first movable apparatus, the first path being calculated by the first movable apparatus in response to detecting a physical factor that affects driving of the first movable apparatus on a global path for a task in a working area, wherein the first path enables the first movable apparatus to avoid being affected by the physical factor to continue to execute the task;

Via the scheduling system, calculating whether the first path conflicts with a second path of each of second movable apparatuses in the working area;

Via the scheduling system, determining, based on at least a calculated result, first information for controlling the first movable apparatus to drive; and Via the scheduling system, sending the first information to the first movable apparatus, Wherein via the scheduling system, determining, based on at least the calculated result, the first information for controlling the first movable apparatus to drive further comprises:

Determining whether the calculated result is a conflict; and

In response to determining that the calculated result is a conflict:

Via the scheduling system, calculating a third path and a control timing sequence of the third path, wherein the third path does not conflict with the second path of each of the second movable apparatuses in temporal and spatial dimensions and enables the first movable apparatus to avoid being affected by the Physical factor and return to the global path to continue to execute the task; and Determining that the first information includes the third path and the control timing sequence, and controlling the first movable apparatus to travel on the third path; or Determining that the first information includes the third path, the control timing sequence, and a message rejecting the first path, and controlling the first movable apparatus; and Wherein when the calculated result is no conflict, the first information is a message allowing the first movable apparatus to use the first path, and the first movable apparatus is configured to travel on the first path when the calculated result is no conflict.

2. The scheduling method according to claim 1, further comprising:

Monitoring whether second information from the first movable apparatus is received, If the second information is received:

Determining whether the second information includes the first path;

If the second information does not include the first path:

Determining whether the first movable apparatus completes the task, and if the first movable apparatus does not complete the task:

Calculating a fourth path, the fourth path being used for the first movable apparatus to continue to execute the task and not conflicting with the second path of each of the second movable apparatuses; and Sending third information to the first movable apparatus, the third information including the fourth path, Or the third information including the fourth path and the message rejecting the first path; and If the second information includes the first path:

Performing the action of receiving the first path.

3. The scheduling method according to claim 1, further comprising: determining whether the number of the first paths is equal to 1 or greater than 1, wherein when the number of paths is greater than 1:

Receiving the first path from the first movable apparatus further comprises:

Determining priority information of each of the first paths, the priority information indicating a priority ranking of the first path, and the first path with a highest priority ranking being a path to considered first;

Calculating whether the first path conflicts with the second path of each of the second movable apparatuses in the working area further comprises:

Calculating whether the corresponding first path conflicts with the second path of the second movable apparatuses in a descending order of the priority ranking, Stopping the calculating when a result that the first path does not conflict with the second path of each of the second movable apparatuses is obtained for the first time; and Continuing to calculate, if there is a conflict between the first path corresponding to the current priority ranking and the second path of each of the second movable apparatuses, whether there is a conflict between the first path of the next priority ranking and the second path of each of the second movable apparatuses; and Determining based on at least the calculated result, the first information for controlling the first movable apparatus to drive further comprises:

Determining when the result that the first path does not conflict with the second path of each of the second movable apparatuses is obtained for the first time, that the first information is a message indicating to use the first path corresponding to the non-conflict result that is obtained for the first time; and If all the first paths conflict with the second path of each of the second movable apparatuses:

Calculating a third path, and determining that the first information includes the third path, wherein the third path enables the first movable apparatus to avoid being affected by the physical factor to continue to execute the task, and the third path does not conflict with the second path of each of the second movable apparatuses; or Calculating the third path, and determining that the first information includes the third path and a message rejecting the first path.

4. The scheduling method according to claim 1, further comprising:

Calculating the global path and a control timing sequence of the global path for executing the task; and Sending the global path and the control timing sequence of the global path to the first movable apparatus.

5. The scheduling method according to claim 4, further comprising:

Loading map information of the working area, and communicating with movable apparatuses in the working area;

Monitoring whether task information about the task is received; and

Selecting, based on at least the task information, the first movable apparatus to be used for executing the task, the first movable apparatus being an idle movable apparatus closest to a starting point of the task.

6. The scheduling method according to claim 4, wherein the global path is calculated by using a Rapid Random Tree (RRT) algorithm and a variant thereof, a real-time obstacle avoidance algorithm based on sensor information, a Dynamic Window Approach, an Artificial Potential Field Method, a Spatio-Temporal Search algorithm, a Spatio-Temporal A* algorithm, an improved A* algorithm, Dijkstra's algorithm, a Genetic algorithm, an Ant Colony Optimization algorithm, a Particle Swarm Optimization algorithm, a Visibility Graph method, a Tangent Graph method, a Breadth-First Search (BFS) algorithm, or a Depth-First Search (DFS) algorithm.

7. The scheduling method according to claim 1, wherein the first path enables the first movable apparatus to return to the global path of the task, and the physical factor is an obstacle or derailment of the first movable apparatus from a track.

8. The scheduling method according to claim 1, wherein the second path of each of the second movable apparatuses includes at least a current driving path and planned but undriven paths.

9. The scheduling method according to claim 1, wherein calculating the third path is based on at least the following factors: a current location, a maximum driving speed, and a braking ability of the first movable apparatus.

10. A scheduling method, comprising:

Sending a first path, the first path being calculated by a first movable apparatus in response to detecting a physical factor that affects driving of the first movable apparatus on a global path for a task in a working area, wherein the first path enables the first movable apparatus to avoid being affected by the physical factor to continue to execute the task; and Determining whether a message allowing the first movable apparatus to use the first path is received;

In response to determining that the message allowing the first movable apparatus to use the first path is not received:

Stopping driving, and receiving first information for controlling the first movable apparatus to drive; and Determining an operation of the first movable apparatus based on the first information, comprising:

When it is determined that the first information includes a third path and a control timing sequence, controlling the first movable apparatus to drive along the third path; or When it is determined that the first information includes the third path, the control timing sequences and a message rejecting the first path, controlling the first movable apparatus to drive along the first path, Wherein the third path is calculated via a scheduling system and does not conflict with a second path of each of the second movable apparatuses in temporal and spatial dimensions and enables the first movable apparatus to avoid being affected by the physical factor and return to the global path to continue to execute the task; and Wherein when the message allowing the first movable apparatus to use the first path is received the first movable apparatus is configured to travel on the first path.

11. The scheduling method according to claim 10, further comprising:

Detecting, by using a sensor, whether the physical factor exists:

If the physical factor exists:

Calculating the first path;

If the physical factor does not exist:

Determining whether third information is received, wherein the third information includes a fourth path, or includes the fourth path and the message rejecting the first path, and the fourth path is used for the first movable apparatus to continue to execute the task and does not conflict with the second path of each of the second movable apparatuses, If the third information is received:

Driving along the fourth path; and

If the third information is not received:

Stopping driving.

12. The scheduling method according to claim 11, further comprising:

Stopping driving if the first movable apparatus receives no indication about a new path when reaching an end of the third path or the fourth path; and Continuing to drive based on the indication about the new path if the first movable apparatus receives the indication about the new path when reaching the end of the third path or the fourth path.

13. The scheduling method according to claim 10, further comprising:

Initializing a sensor;

Communicating with the scheduling system and sending second information of the first movable apparatus to the scheduling system; and Continuously detecting whether task information from the scheduling system, the global path, and a control timing sequence of the global path for executing the task information are received.

14. The scheduling method according to claim 10, wherein the number of the first paths is equal to 1 or greater than one, and when the number of the first paths is greater than 1, each of the first paths includes priority information, the priority information indicating a priority ranking of the first path, and the first path with a highest priority ranking being a path to be considered first.

15. The scheduling method according to claim 10, wherein the physical factor is an obstacle or derailment of the first movable apparatus from a track, and the first path enables the first movable apparatus to return to the global path.

16. The scheduling method according to claim 10, further comprising: sending, by the first movable apparatus, second information of the first movable apparatus to the scheduling system after completing driving on any path.

17. The scheduling method according to claim 10, further comprising: monitoring whether driving on the first path is completed, and continuing the driving on the first path when the physical factor is unchanged, and the driving on the first path is not completed.

18. A movable apparatus, comprising:

A controller, the controller executing software to implement the method according to claim 10.

* * * * *